(12) United States Patent
Selle

(10) Patent No.: US 9,261,126 B2
(45) Date of Patent: Feb. 16, 2016

(54) RIVET BOLT IN COMBINATION WITH AN ATTACHMENT AND PROCESS FOR MAKING SAME

(71) Applicant: STAFAST PRODUCTS, INC., Painesville, OH (US)

(72) Inventor: Stephen R. Selle, Mentor, OH (US)

(73) Assignee: STAFAST PRODUCTS, INC., Painesville, OH (US)

( * ) Notice: Subject to any disclaimer, the term of this patent is extended or adjusted under 35 U.S.C. 154(b) by 20 days.

(21) Appl. No.: 14/038,473

(22) Filed: Sep. 26, 2013

(65) Prior Publication Data

US 2015/0086294 A1 Mar. 26, 2015

(51) Int. Cl.
  *F16B 37/04* (2006.01)
  *F16B 23/00* (2006.01)
  *B21K 1/46* (2006.01)
  *B21J 15/02* (2006.01)
  *B23P 19/06* (2006.01)

(52) U.S. Cl.
  CPC .............. *F16B 23/0007* (2013.01); *B21J 15/02* (2013.01); *B21K 1/463* (2013.01); *F16B 23/003* (2013.01); *F16B 23/0023* (2013.01); *F16B 23/0038* (2013.01); *B23P 19/063* (2013.01)

(58) Field of Classification Search
  CPC ....... F16B 37/065; F16B 37/04; B23P 19/063

USPC .......... 411/81, 103, 107, 111–112, 166, 183, 411/501, 402–403
See application file for complete search history.

(56) References Cited

U.S. PATENT DOCUMENTS

| | | | |
|---|---|---|---|
| 1,705,086 A * | 3/1929 | Ferguson | 411/378 |
| 3,235,917 A | 2/1966 | Skubic | |
| 4,352,258 A | 10/1982 | Bursk et al. | |
| 4,913,609 A | 4/1990 | Mauer | |
| 5,010,690 A | 4/1991 | Geoffrey | |
| 5,230,181 A | 7/1993 | Geoffrey et al. | |
| 5,517,788 A | 5/1996 | McGough et al. | |
| 5,524,391 A | 6/1996 | Joffe et al. | |
| 5,618,144 A | 4/1997 | Leistner | |
| 5,638,641 A | 6/1997 | Joffe et al. | |
| 6,185,870 B1 | 2/2001 | Mettler | |

* cited by examiner

*Primary Examiner* — Roberta Delisle
(74) *Attorney, Agent, or Firm* — Woodling, Krost and Rust

(57) ABSTRACT

A rivet bolt in combination with an attachment wherein the rivet bolt includes: a flange having a top surface and a bottom surface, and, a shaft having a threaded portion. An upper cylindrical portion of the rivet bolt includes an upper edge and an interior base surface having a drive head socket. The attachment receives the rivet bolt and comprises: a top surface, a bottom surface, a cylindrical bore therethrough, and an inverted frusto-conical surface extending from the top surface to the cylindrical bore. The upper cylindrical portion of the rivet bolt is deformed and rotatably and slidingly engages the inverted frusto-conical surface extending from the top surface of the attachment to the cylindrical bore therethrough. The upper cylindrical portion of the rivet bolt resides partially within the cylindrical bore. A process for making a rivet bolt in combination with an attachment is disclosed.

24 Claims, 32 Drawing Sheets

RIVET BOLT IN COMBINATION WITH AN ATTACHMENT AND PROCESS FOR MAKING SAME

FIELD OF THE INVENTION

This invention is in the field of rivet bolts used to join two substrates or devices together.

BACKGROUND OF THE INVENTION

Orbital riveters have been used in the past on relatively expensive rivet bolts. Orbital riveters are large and expensive. It is difficult to use multiple orbital riveters side by side as they occupy considerable space and, therefore, they cannot be easily used side by side to deform rivet bolt heads (upper portions) that are spaced relatively close together.

U.S. Pat. No. 6,185,870, states, in the abstract, as follows: "[a} one-piece wood rivet having a first upper portion and a second lower portion is disclosed for use in adjustably securing a first piece of wood to a second piece of wood. A typical application of the rivet is the adjustment of a door threshold assembly. The first upper portion of the one-piece wood rivet includes a head and a flange. The second lower portion of the one-piece wood rivet includes a threaded shank which mates with a nut affixed to the second piece of wood. The head of the first upper portion of the one-piece wood rivet includes a lip which is deformable into a countersunk bore in the first piece of wood. The one-piece wood rivet resides substantially in a bore which extends through the first piece of wood. The one piece wood rivet is rotatable within the bore of the first piece of wood and is secured to the first piece of wood by its flange and the deformed lip. The second piece of wood includes a bore therethrough and a nut having threads affixed to the second piece of wood. The threads of the wood rivet mate with the threads of the nut. The first and second piece of wood are adjustably separated from each other by a distance determined by the extent of the threading between the rivet and the nut."

U.S. Pat. No. 6,185,870 is incorporated herein in its entirety by reference hereto. U.S. Pat. No. 6,185,870 and the instant invention are assigned to the same entity.

SUMMARY OF THE INVENTION

A rivet bolt in combination with an attachment is disclosed and claimed. The rivet bolt comprises: a flange; the flange includes a top surface and a bottom surface; an upper cylindrical portion; a first fillet between the upper cylindrical portion and said flange; a shaft; a second fillet between the shaft and the flange; the shaft includes a threaded portion; the upper cylindrical portion includes an upper edge; and, the upper cylindrical portion includes an interior base surface. The attachment comprises: a top surface and a bottom surface; a cylindrical bore therethrough; an inverted frusto-conical surface extending from the top surface of the attachment to the cylindrical bore through the attachment; the top surface of the flange of the rivet bolt engages the bottom surface of the attachment; the upper cylindrical portion of the rivet bolt is reciprocally shaped and slidingly engages the inverted frusto-conical surface extending from the top surface of the attachment to the cylindrical bore through the attachment; and, the upper cylindrical portion of the rivet bolt resides partially within the cylindrical bore of the attachment The upper cylindrical portion of the rivet bolt is sized such that the inverted frusto-conical surface thereof is deformable by a vertical punch such that the deformation results in substantial occupation of the space allotted by the inverted frusto-conical surface of the attachment. The size, material and force applied by the punch may be varied as desired to produce the required deformation of the rivet bolt into the allotted space.

The attachments are substrates made of aluminum (or other metal), wood or plastic and they are used as door caps (sills). The rivet bolts are installed into the attachments such that they are rotatable with respect to the attachments but not longitudinally movable along the axis of the rivet bolt. In the aluminum metal attachment, countersinking a bore is necessary to form a countersunk portion into which the upper cylindrical portion of the rivet bolt is deformed. When the attachment is made of wood or plastic, a countersunk portion is not needed as the wood or plastic materials deform as the upper cylindrical portion of the rivet bolt is deformed into the wood or plastic under the force of the punch.

The instant invention has several advantages. First, it is economical to deform the rivet bolt of the present invention with the punch because it can be done faster on a lower cost heading machine. Second, another advantage is in the actual installation. The deformation of the rivet bolt of the present invention takes about 0.25 seconds. The deformation of the rivet bolt of the U.S. Pat. No. 6,185,870 takes about 2-3 seconds using an orbital riveter. The cost of an orbital riveter is about $12,000 and the air cylinder (piston) and punch of the present invention is much less costly, about $500 per head Yet another advantage of the present invention is space. Standard orbital riveters require considerable space. Using 4 standard orbital riveters to compress multiple rivet bolts simultaneously in one door sill is impossible. If the orbital riveters are customized so as to reduce the space they require, multiple orbital riveters may be used with substantially increased costs. Using multiple air cylinders/pistons as disclosed herein can easily handle a 9 inch centerline spacing from one rivet bolt to the next using standard air cylinders.

A process for making a rivet bolt in combination with an attachment is disclosed and claimed.

The process includes the steps of:

positioning an attachment, the attachment has a cylindrical bore therethrough and the attachment has an inverted frusto-conical surface extending from a top surface of the attachment to the cylindrical bore of the attachment, in alignment with axis, A, of the rivet bolt, the rivet bolt has an upper cylindrical portion;

positioning a support block in alignment with axis, A, of the rivet bolt;

inserting the upper cylindrical portion of the rivet bolt into and through the cylindrical bore of the attachment;

forcefully engaging the top of the flange of the rivet bolt with the bottom surface of the attachment;

inserting the threaded portion of the shaft of the rivet bolt and the unthreaded portion of the shaft of the rivet bolt in a bore of the support block aligned with the axis A;

forcefully engaging the top surface of the block into engagement with the bottom surface of the flange of the rivet bolt;

deforming, using a punch operating along the axis A, the inverted frusto-conical surface of the rivet bolt extending from the upper edge of the cylindrical upper portion to the interior base surface, such that the cylindrical upper portion of the rivet bolt is reciprocally shaped with respect to the inverted frusto-conical surface of the attachment; and, removing the threaded portion of the shaft of the rivet bolt and the unthreaded portion of the shaft of the rivet bolt from the bore of the support block allowing the rivet bolt to slidingly engage the inverted frusto-conical surface extending from the top surface of the attachment to the cylindrical bore through the attachment.

It is an object of the invention to provide a rivet bolt in combination with an attachment.

It is an object of the invention to countersink a through bore in an attachment when that attachment is a metal or other rigid material.

It is an object of the invention to provide a through bore in an attachment when that attachment is wood or a plastic.

It is an object of the present invention to quickly deform the upper cylindrical portion of the rivet bolt.

It is an object of the present invention to deform multiple rivet bolts in a door sill simultaneously.

It is an object of the present invention to deform multiple rivet bolts in a door sill simultaneously wherein the rivet bolts are spaced close together.

It is an object of the invention to provide a rivet bolt in combination with an attachment wherein a punch is used to reciprocally deform the upper cylindrical portion of the bolt into an inverted frusto-conical surface extending from the top surface of the attachment to the cylindrical bore through the attachment.

It is an object of the invention to provide a rivet bolt in combination with an attachment wherein a punch is used instead of an orbital riveter to reciprocally deform the upper cylindrical portion of the bolt into an inverted frusto-conical surface extending from the top surface of the attachment to the cylindrical bore through the attachment.

It is an object of the invention to provide a rivet bolt in combination with an attachment wherein the rivet bolt includes a phillips socket and is driven by a phillips drive head.

It is an object of the invention to provide a rivet bolt in combination with an attachment wherein the rivet bolt includes a hexagonal socket and is driven by a hexagonal drive head.

It is an object of the invention to provide a rivet bolt in combination with an attachment wherein the rivet bolt includes a torx socket and is driven by a torx drive head.

It is an object of the invention to provide a rivet bolt in combination with an attachment wherein the rivet bolt includes a square socket is driven by a square drive head.

It is an object of the invention to provide a rivet bolt in combination with an attachment wherein the rivet bolt includes a slot socket and is driven by a slot drive head.

It is an object of the invention to provide a rivet bolt in combination with an attachment wherein the upper cylindrical portion of the rivet bolt is sized such that the inverted frusto-conical surface thereof is deformable by a vertical punch such that the deformation results in substantial occupation of the space allotted by the inverted frusto-conical surface of the attachment.

It is an object of the invention to provide a rivet bolt which is deformable by a punch as compared to being deformable by an orbitable riveter wherein the rivet bolt includes an upper cylindrical portion having an inverted frusto-conical surface capable of deformation by a punch.

It is an object of the invention to provide a rivet bolt which is deformable by a punch as compared to being deformable by an orbitable riveter wherein the rivet bolt includes an upper portion having an inverted frusto-conical surface which continues to an interior base and which is capable of deformation by a punch.

It is an object of the invention to provide a rivet bolt which is deformable by a punch as compared to being deformable by an orbitable riveter wherein the rivet bolt includes an upper portion having an inverted frusto-conical surface which continues to an interior base having a socket for driving the rivet bolt.

It is an object of the invention to provide a rivet bolt which includes a recessed interior base surface having a socket for mating with a driver to rotate the rivet bolt.

It is an object of the invention to provide a rivet bolt which includes a recessed interior base surface having a socket for mating with a driver to rotate the rivet bolt and wherein the socket may be a phillips socket, a hexagonal socket, a torx socket, a square socket, or a slot socket.

It is an object of the invention to provide a process of deforming, using a punch operating along the axis A, the inverted frusto-conical surface of the rivet bolt extending from the upper edge of the cylindrical upper portion to the interior base surface, such that the cylindrical upper portion of the rivet bolt is reciprocally shaped with respect to the inverted frusto-conical surface of the attachment.

It is an object of the invention to provide a rivet bolt that has attributes of a rivet and that has attributes as a bolt.

It is an object of the invention to provide a rivet bolt affixed to an attachment such that it may rotate with respect to the attachment but may not be removed from the attachment or be moved axially with respect to the attachment.

It is an object of the invention to provide a rivet bolt affixed to an attachment such that it is not movable axially along the axis of the rivet bolt.

These and other objects will be best understood when reference is made to the brief description of the drawings, the description of the invention and the claims which follow hereinbelow.

The invention will be best understood when reference is made to the description of the invention and claims which follow hereinbelow.

DESCRIPTION OF THE INVENTION

Figure 1:
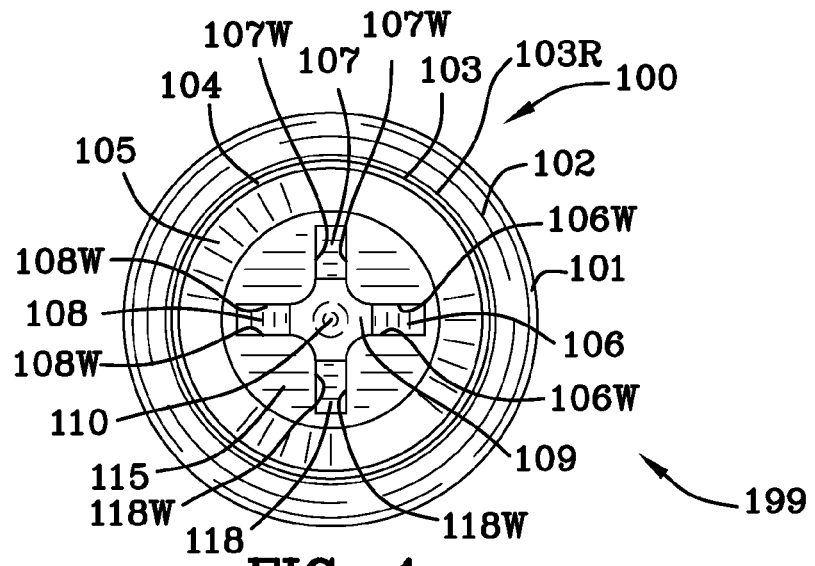
FIG. 1 is a top view of the rivet bolt.
Figure 1A:
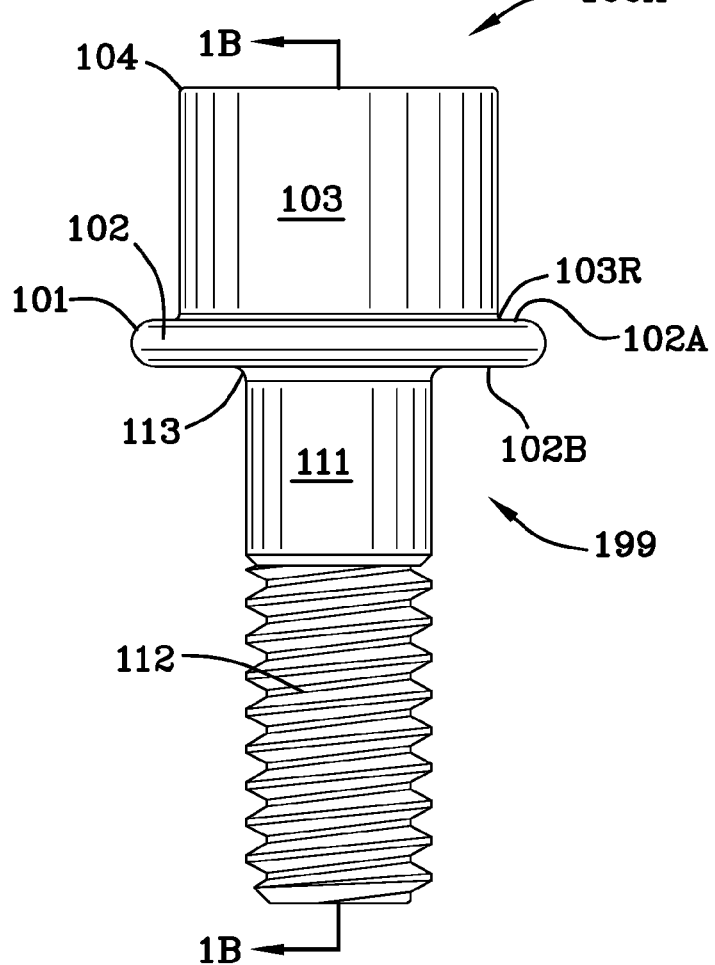
FIG. 1A is a side view of the rivet bolt.
Figure 1B:
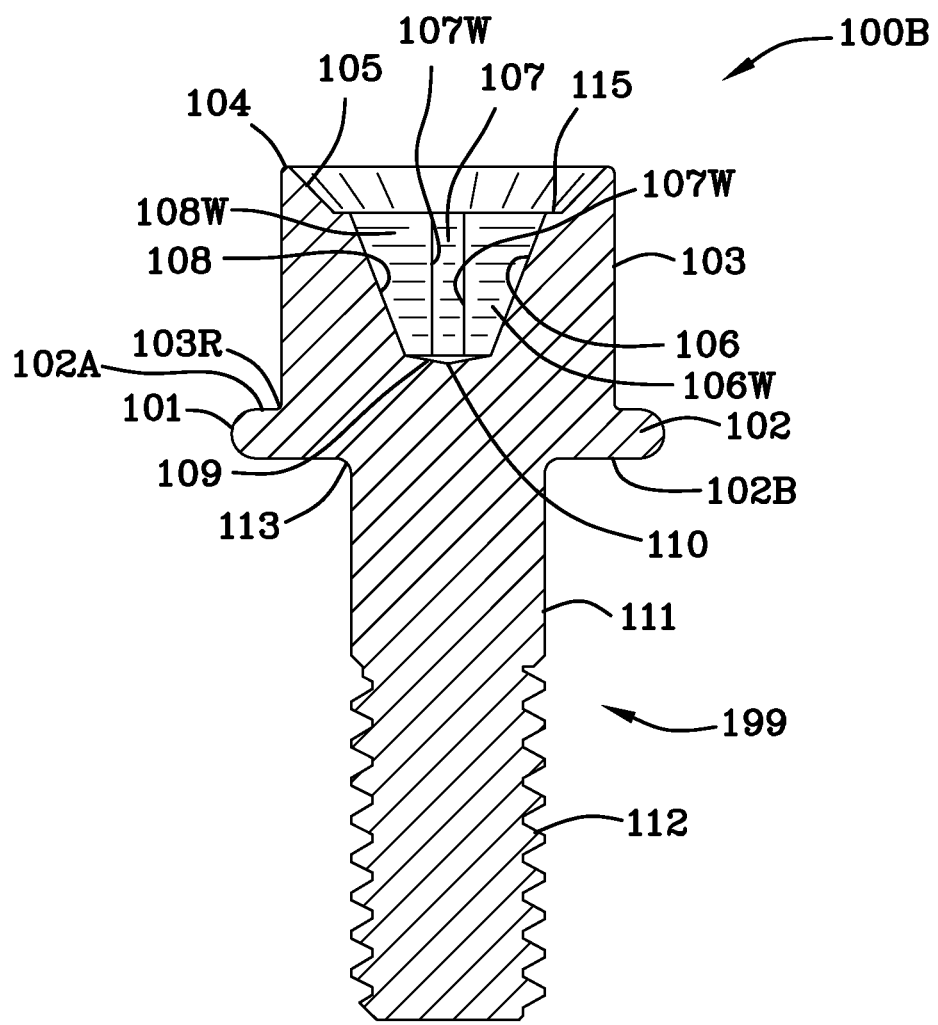
FIG. 1B is cross-sectional view of the rivet bolt taken along the lines 1B-1B of FIG. 1A.
Figure 1C:
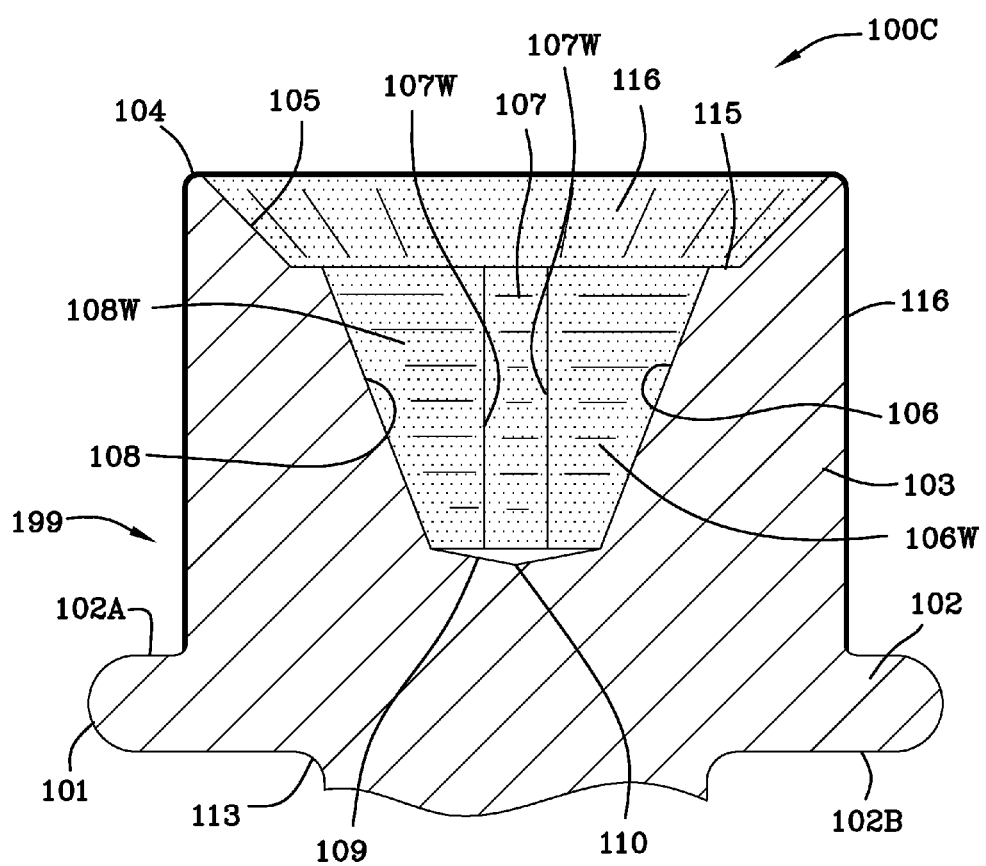
FIG. 1C is an enlarged cross-sectional view of the upper portion of the rivet bolt illustrating zinc coating on the interior and exterior thereof.

FIG. 1 is a top view 100 of the rivet bolt 199. Preferably the rivet bolts 199, 199A, 199B, 199C, and 199D are made of steel. Alternatively, the rivet bolts 199, 199A, 199B, 199C, and 199D can be made from stainless steel, brass, aluminum, or zinc die cast. FIG. 1A is a side view 100A of the rivet bolt 199. FIG. 1B is a cross-sectional view 100B of the rivet bolt 199 taken along the lines 1B-1B of FIG. 1A. FIG. 1C is an enlarged cross-sectional view 100C of the upper cylindrical portion 103 of the rivet bolt 199 illustrating zinc coating 116 on the interior and exterior thereof. Zinc coating prevents the steel of the rivet bolt from rusting. Zinc is more reactive than the steel. As such, zinc reacts with water and air, and thus protects the steel. Other coating materials such as black oxide may be used for a coating material. It is contemplated that many different coating materials may be used.

Referring to FIGS. 1, 1A, 1B and 1C, rivet bolt 199 includes a flange 102 having a rounded edge 101. Radius or fillet 103R resides between flange 102 and upper cylindrical portion 103. Radius or fillet 113 resides between flange 102 and shaft 111. A portion of the shaft 111 includes threads 112 for mating with a nut or other device when the rivet bolt 199 is used in an application.

Figure 2:
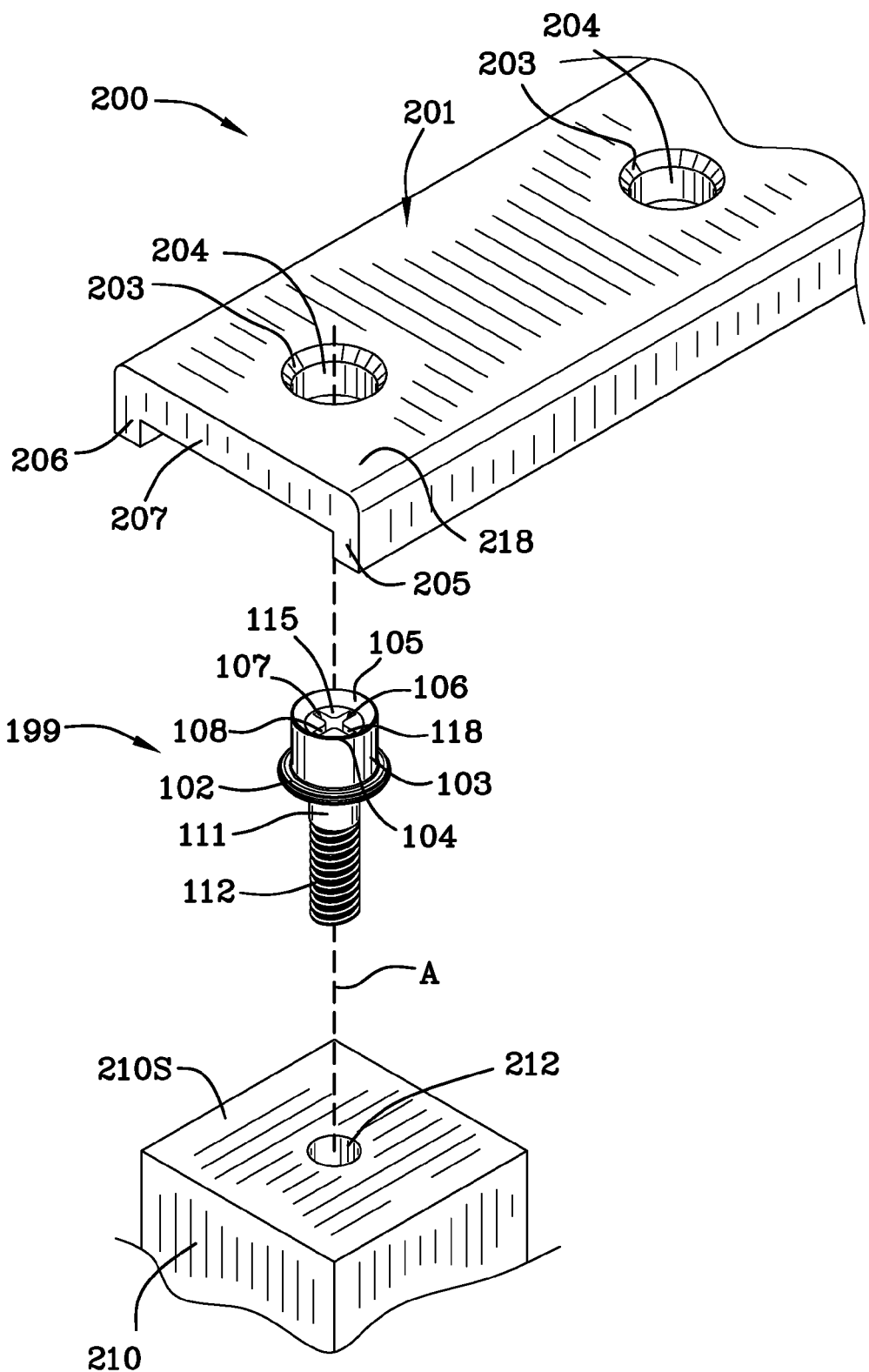
FIG. 2 is an exploded perspective view of the rivet bolt in position for affixation to a metallic attachment wherein the attachment includes an inverted frusto-conical surface extending from the top surface of the attachment to a bore in the attachment.
Figure 2A:
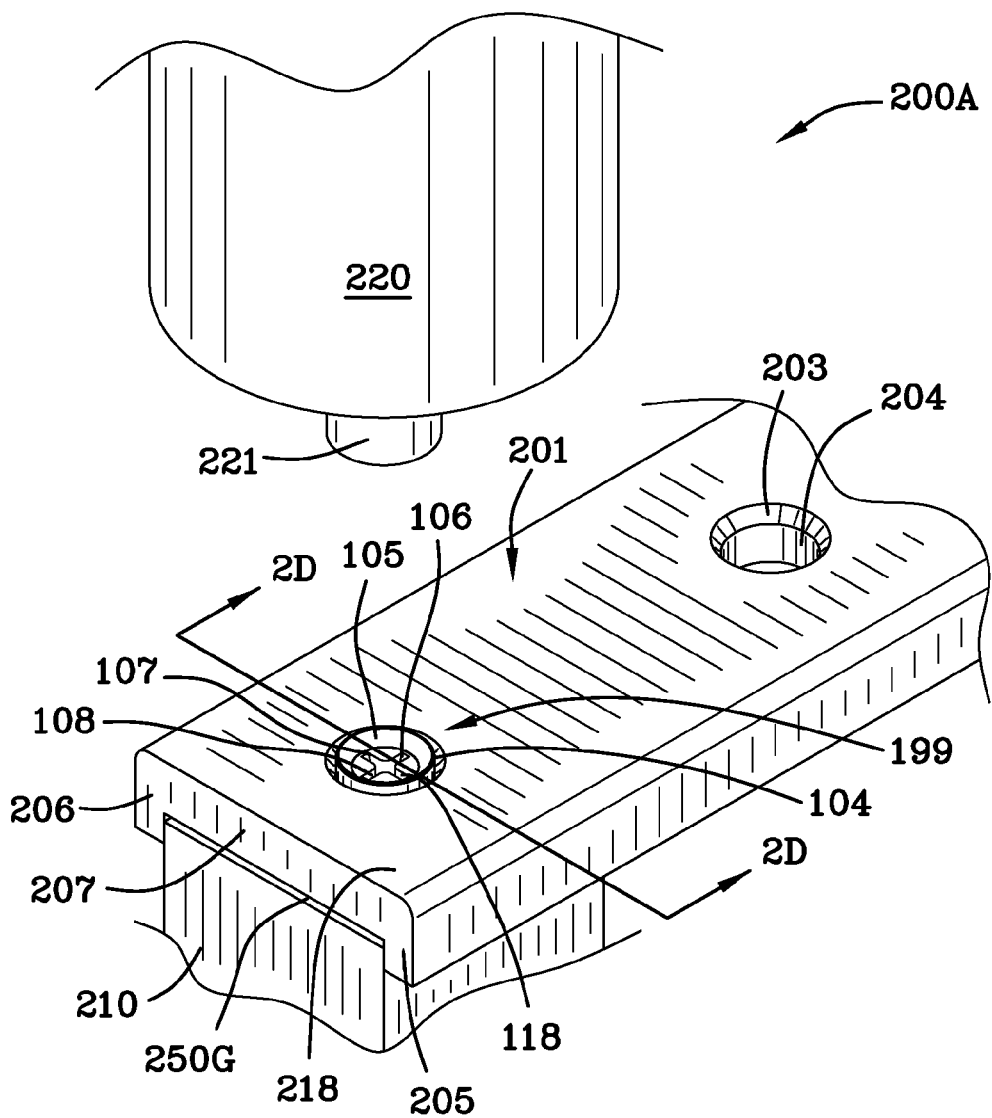
FIG. 2A is a perspective view of the piston and plunger driven by the piston positioned above the rivet bolt.
Figure 2B:
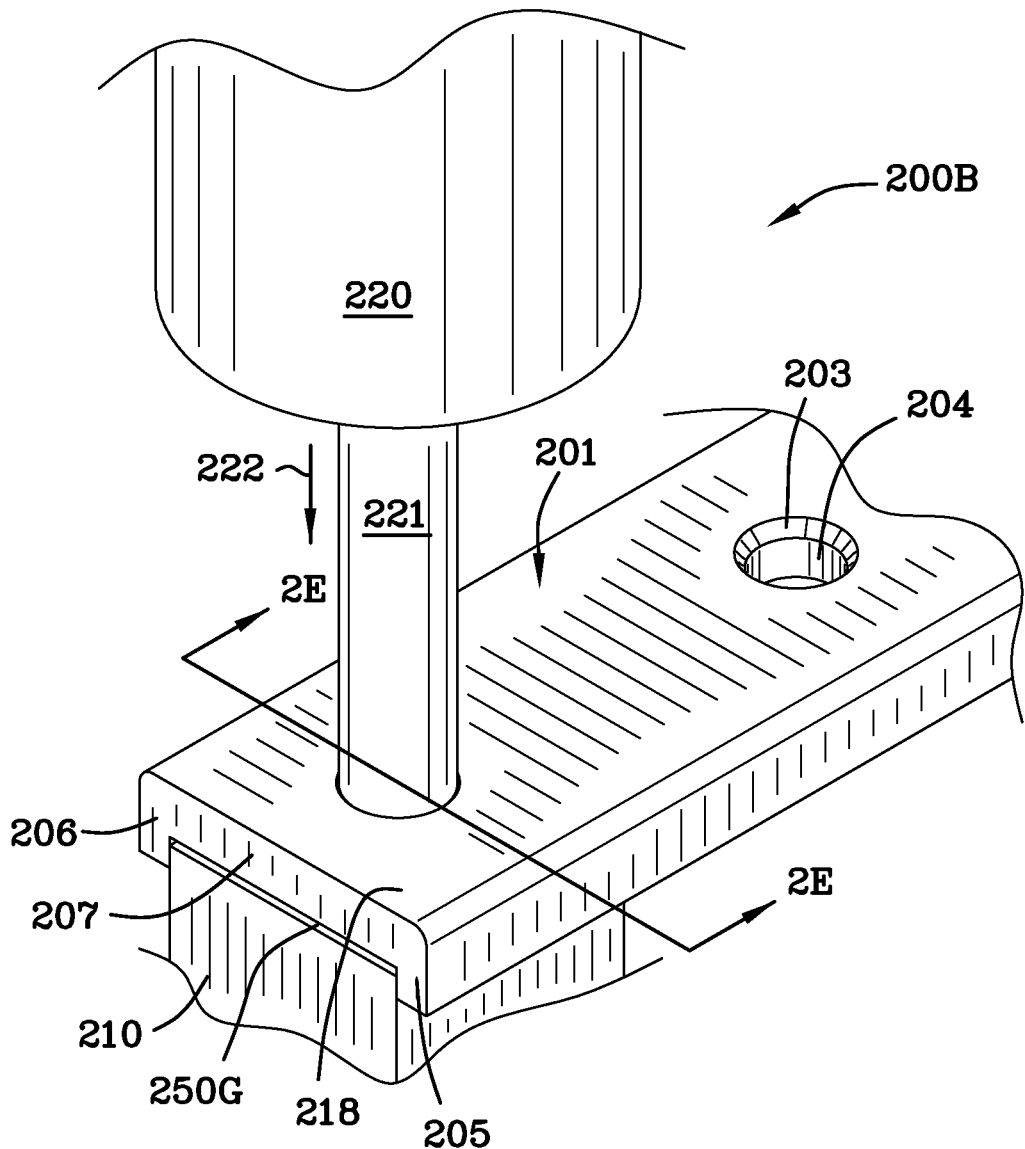
FIG. 2B is a perspective view similar to FIG. 2A, however, the punch has been extended in a downward direction as indicated by an arrow.
Figure 2C:
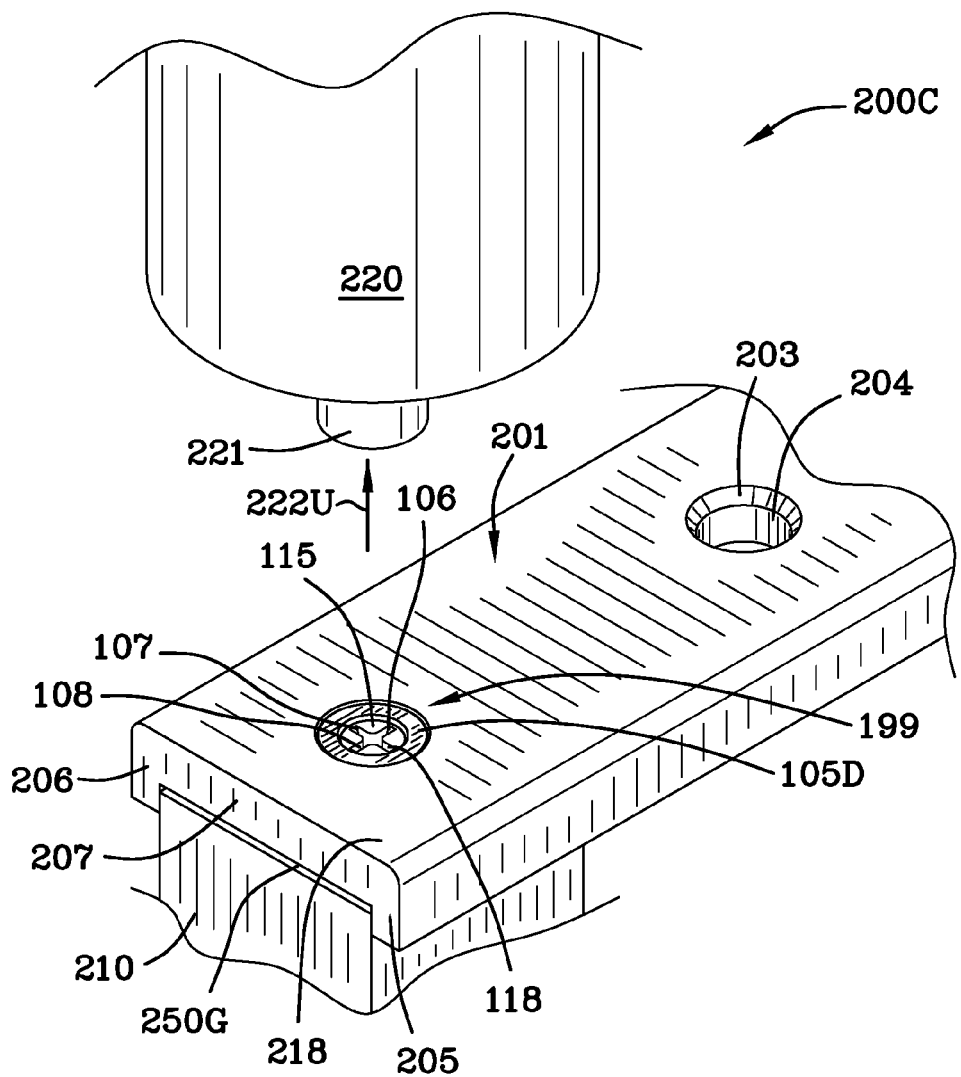
FIG. 2C is a perspective view similar to FIG. 2A illustrating the upper edge of the upper cylindrical portion of the rivet bolt and the deformed inverted frusto-conical surface.
Figure 2D:
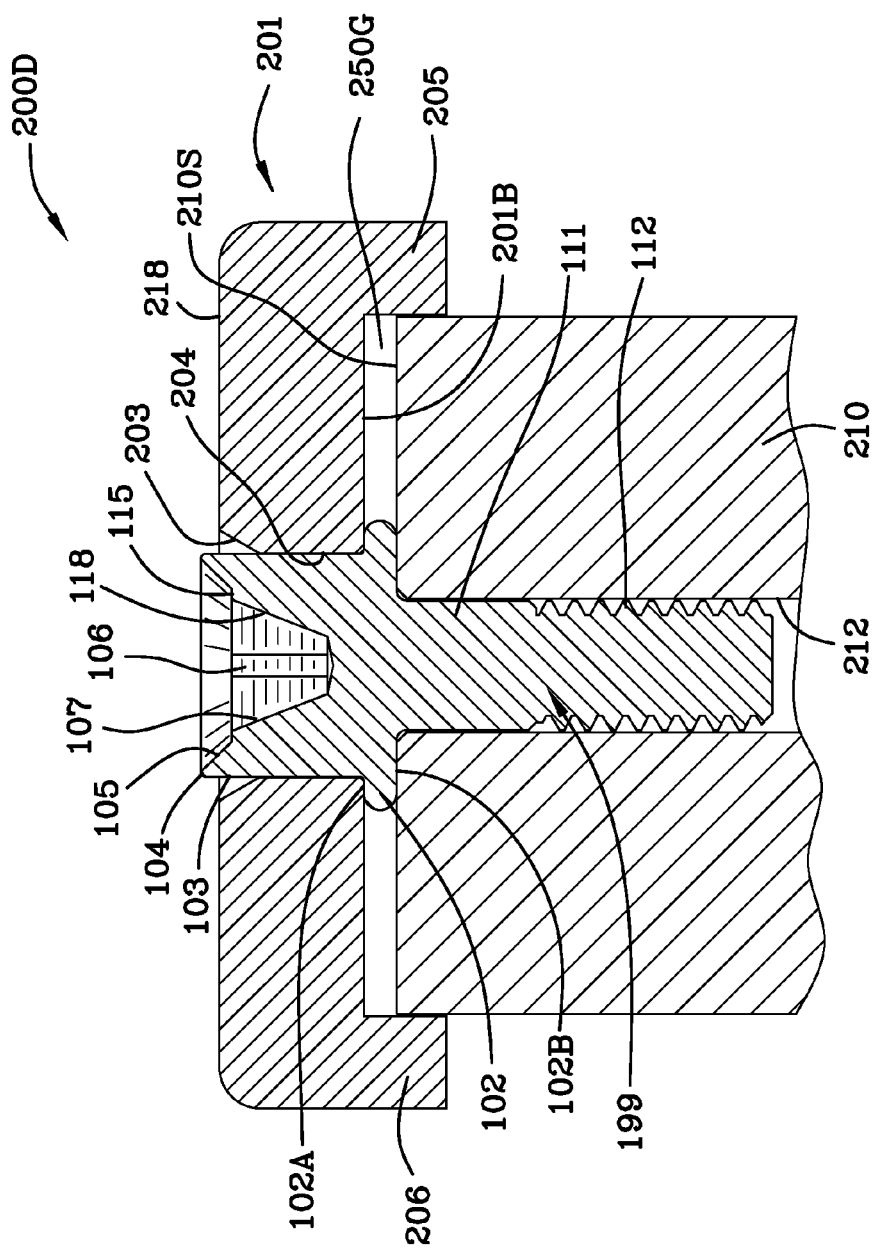
FIG. 2D is a cross-sectional view taken along the lines 2D-2D of FIG. 2A illustrating the rivet bolt protruding slightly above the surface of the attachment.
Figure 2E:
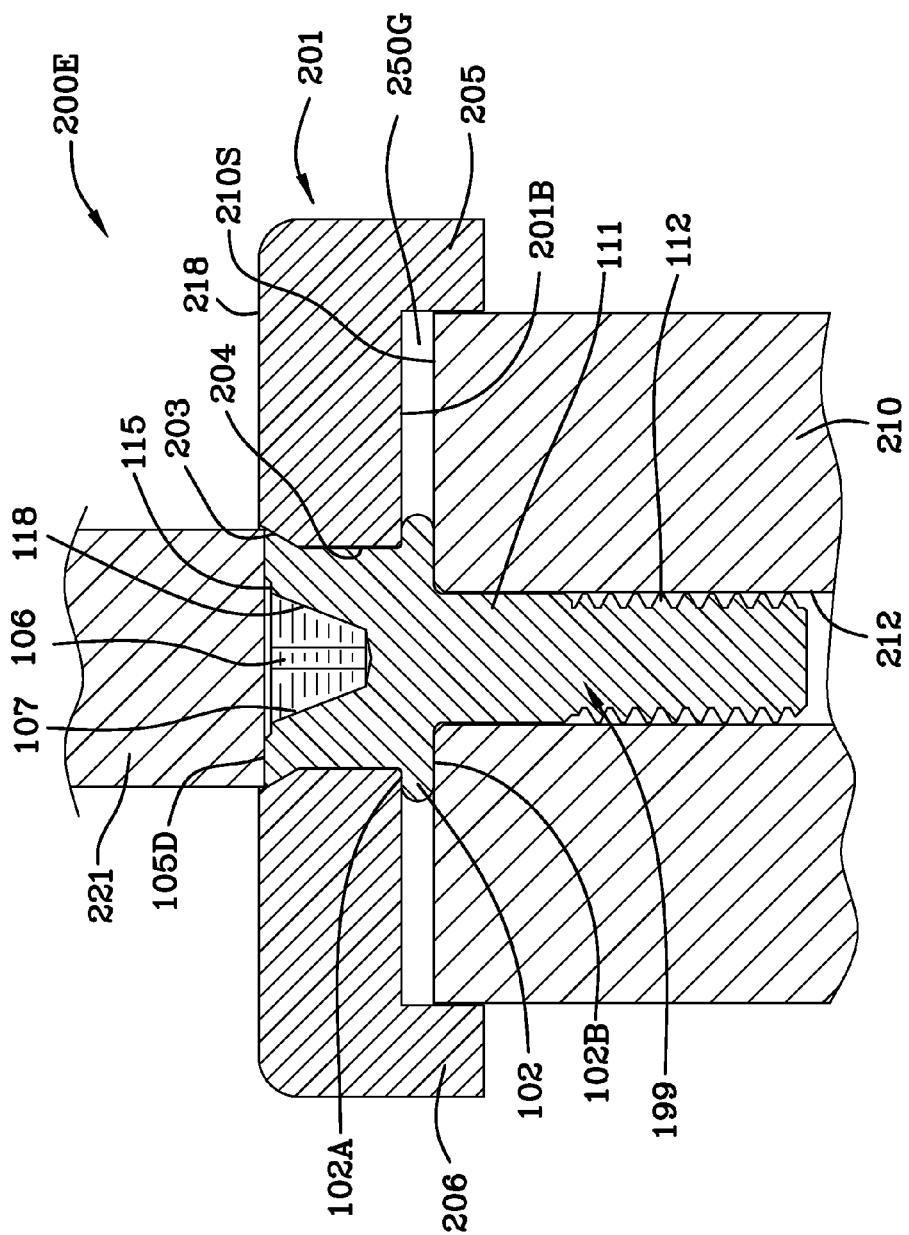
FIG. 2E illustrates the rivet bolt deformed and in sliding engagement with the inverted frusto-conical surface of the attachment.
Figure 2F:
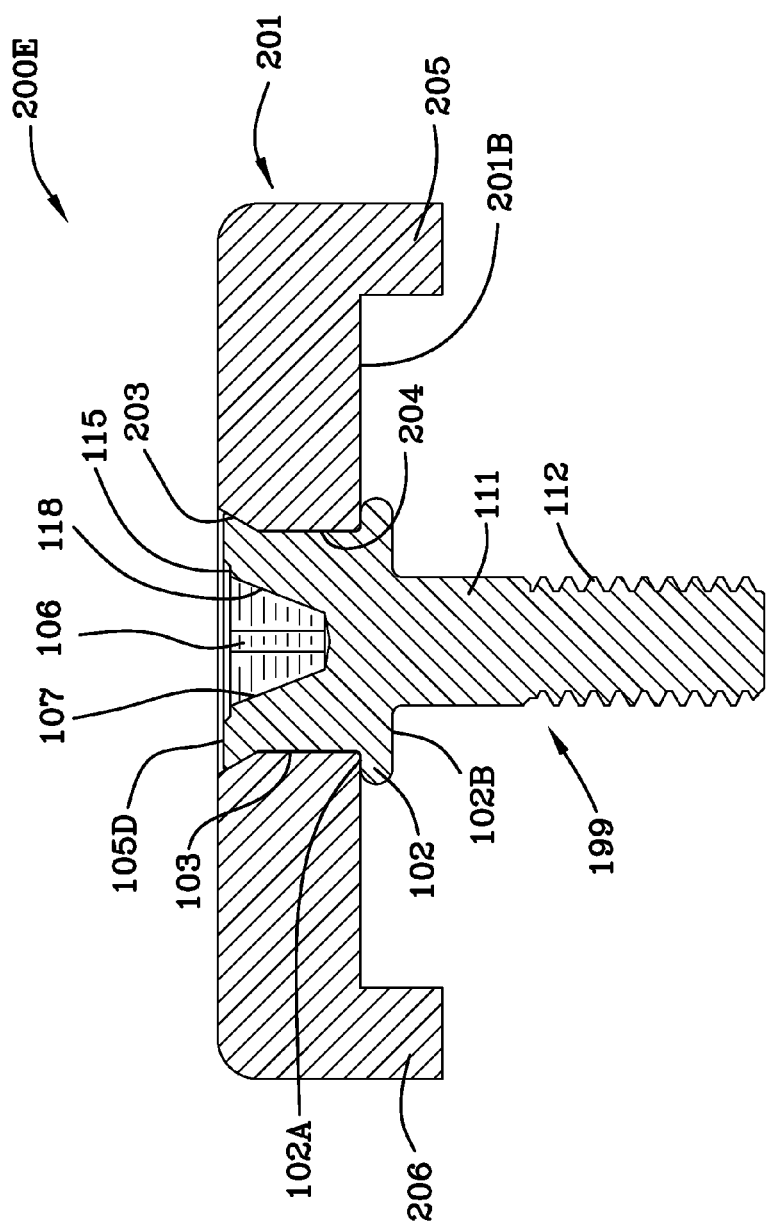
FIG. 2F is a cross-sectional view similar to FIG. 2E without the block.

Flange 102 includes a top surface 102A which engages with the bottom surface 201B of attachment 201 as illustrated in FIGS. 2D and 2E. Flange 102 further includes a bottom surface 102B of flange 102 which engages the top surface 210S of block 210 as illustrated in FIGS. 2D and 2E. Upper edge 104 of upper cylindrical portion 103 is best viewed in FIGS. 1, 1A and 1B. Inverted frusto-conical surface 105 extends from the upper edge 104 of the cylindrical upper portion 103 to interior base surface 115 as best viewed in FIGS. 1, 1B and 1C. Reference numeral 105 is used to indicate the inverted frusto-conical surface 105 which resides on an unnumbered portion of the upper cylindrical portion 103 which forms surface 105. This unnumbered portion of the upper cylindrical portion 103 is sized and shaped so as to substantially fill the inverted frusto-conical portion 203 of the attachment 201 after deformation. Interior base 115 includes a phillips socket. Other socket forms are set forth in different examples of the invention as indicated in FIGS. 3-6. Deformed inverted frusto-conical surface 105D is best viewed in FIGS. 2C and 2E. The deformation occurs when punch 221 compresses the steel of the rivet bolt and pushes it into the form of the inverted frusto-conical surface 203 of the attachment 201. After deformation, the metal of the rivet bolt is compressed and resides slightly below surface 218 as illustrated in FIGS. 2C, 2E, and 2F.

FIG. 1 illustrates the first groove or slot 106, the second groove or slot 107, the third groove or slot 108 and the fourth groove or slot 118 of the phillips socket in the interior base 115 of the upper cylindrical portion 103 of the rivet bolt. A first pair of walls 106W form groove or slot 106, a second pair of walls 107W form groove or slot 107, a third pair of walls 108W form groove or slot 108, and a fourth pair of walls form groove or slot 118 of the Phillips socket as illustrated in FIGS. 1, 1B, 1C and others. A phillips head driver fits within the grooves and slots and drives the rivet bolt 199 as desired.

Referring to FIGS. 1B and 1C, relief 109 and the apex 110 of the relief are illustrated. Relief 109 and apex 110 of the relief are created from the manufacturing process of the slots and the walls of the slots.

FIG. 1B is a cross-sectional view 100B of the rivet bolt 199 taken along the lines 1B-1B of FIG. 1A. FIG. 1C is an enlarged cross-sectional view 100C of the upper portion 103 of the rivet bolt 199 illustrating zinc coating 116 on the interior and exterior thereof. Other coatings are specifically contemplated, for instance, a black oxide coating may be used. The coatings protect against rust (oxidation). Zinc can protect against oxidation even if some of the zinc is chipped away from the steel underneath the coating.

Various types of steels may be used for the rivet bolts 199, 199A, 199B, 199C, 199D depicted in the drawing figures.

FIG. 2 is an exploded perspective view 200 of the rivet bolt 199 in position for attachment to a attachment 201 wherein the attachment includes an inverted frusto-conical surface 203 extending from the top surface of the attachment 201 to a bore 204 in the attachment. The attachment 201 includes a plurality of inverted frusto-conical surfaces 203 and a plurality of corresponding bores 204 therein. Further, the attachment 201 includes a first leg 205 and a second leg 206 and an end 207. It will be understood by those skilled in the art that another end exists on member 201 which is not shown herein. Fixture block 210 includes bore 212 therethrough which receives threaded portion 112 and shaft portion 111 during the process of securing the rivet bolt 199 to the attachment 201.

FIG. 2A is a perspective view 200A of the piston 220 and punch 221 driven by the piston positioned above the rivet bolt 199. Block 210 provides stability for the shaft 111 and the threads 112 of the rivet bolt 199. Shaft 111 and the threads 112 of the rivet bolt 199 are first inserted into the bore 212 of the block 210 followed by insertion of the upper cylindrical portion 103 of the rivet bolt into the bore 204 of attachment 201.

FIG. 2D is a cross-sectional view taken along the lines 2D-2D of FIG. 2A illustrating the rivet bolt 199 protruding slightly above the surface 218 of the attachment 201. After deformation, reference numeral 105D represents the deformed condition or state of the previously shaped inverted frusto-conical portion 105 of the upper cylindrical portion 103 of the rivet bolt. Flange 102 is trapped between the top surface 210S of block 210 and the bottom surface 201B of attachment 201. Specifically, the top surface 102A of flange 102 engages the bottom surface 201B of the attachment and the bottom surface 102B of flange 102B engages the top surface 210S of block 210. Once the rivet bolt 199 is positioned as in FIGS. 2A and 2D, the upper edge 104 of upper cylindrical portion 103 will and the inverted frusto-conical surface 105 extending from the upper edge 104 of the cylindrical upper portion 104 to the interior base surface 115 is ready to be deformed by the piston 221 and cylinder 220 as illustrated in FIGS. 2A, 2B, 2C and 2D. FIG. 2E is a cross-sectional view taken along the lines 2D-2D of FIG. 2A illustrating the punch 221 engaging and deforming the inverted frusto-conical surface indicated by reference numeral 105D. Reference numeral 105D signifies the deformed inverted frusto-conical surface extending from the upper edge 104 of the cylindrical upper portion 104 to interior base surface 115 as illustrated in FIG. 2E. FIG. 2E illustrates the metal rivet bolt 199 deformed and in loose engagement with surface 203 of the attachment 201 such that the rivet bolt 199 may be rotated within attachment 201. All of the examples of the rivet bolt disclosed herein, 199, 199A, 199B, 199C, 199D and 199E have attributes of a rivet in that after deformation the upper cylindrical portions thereof are restrained from movement along axis A with respect to the attachment. In other words, the riveting action of the punch 221 restrains the rivet bolt with respect to the attachment. Further, all of the examples of the rivet bolt disclosed herein, 199, 199A, 199B, 199C, 199D and 199E have attributes of a bolt in that rotation of the bolt for affixation to a nut or other connector or other device is possible.

Punch 221 deforms the metal of the inverted frusto-conical shaped section of the rivet bolt into the inverted frusto-conical surface as illustrated in FIG. 2E. After the deformation of the inverted frusto-conical section as illustrated in FIG. 2E, it will be noticed that the surface 115 is spaced slightly below the deformed surface 105D as illustrated in FIG. 2E. Inverted frusto-conical surface 203 extends from the top surface of the attachment 201 to a bore 204 in the attachment 201. Gap 250G exists between the bottom surface 201B of the attachment 201 and the top service 210S of the block 201.

FIG. 2B is a perspective view 200B similar to FIG. 2A, however, the punch 221 has been extended in a downward direction as indicated by arrow 222. Punch 221 is illustrated completely covering the upper edge 104 of upper cylindrical portion 103 and completely covering the inverted frusto-conical surface 105 extending from the upper edge 104 of the cylindrical upper portion 104 to interior base surface 115.

FIG. 2C is a perspective view similar to FIG. 2A illustrating the upper edge 104 of upper cylindrical portion 103 and the deformed inverted frusto-conical surface indicated by reference numeral 105D. Arrow 222U indicates the punch 221 moving in a direction away from the rivet bolt 199. Reference numeral 104D illustrates the deformed upper edge.

FIG. 2F is a cross-sectional view similar to FIG. 2E without the block. FIG. 2F clearly illustrates the rivet bolt 199 secured to the attachment 201. The inverted frusto-conical surface 105 is deformed substantially into the inverted frusto-conical surface 203 of the attachment, however, the deformation of the rivet bolt 199 does not prevent the rivet bolt from rotating with respect to the attachment. Upper cylindrical portion 103 of the rivet bolt 199, after deformation, fits within the bore 204 of attachment 201 such that it is rotatable with respect to the bore 204. Rivet bolt 199 must be rotatable because as it is designed to be fastened to a structure that is not shown.

Figure 2G:
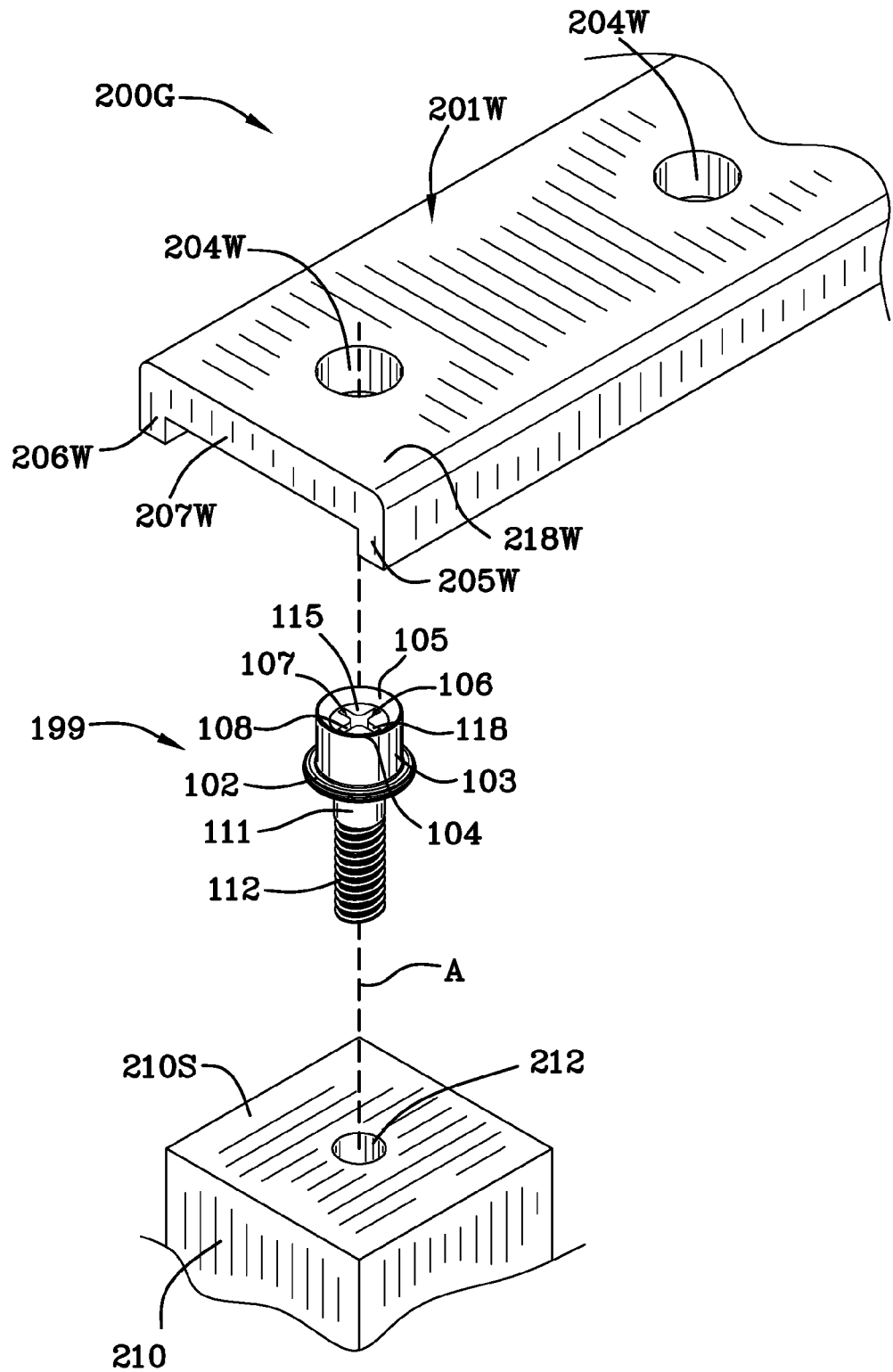
FIG. 2G is an exploded perspective view of the rivet bolt in position for attachment to an attachment wherein the attachment includes a bore completely therethrough and where the attachment is made of wood.
Figure 2H:
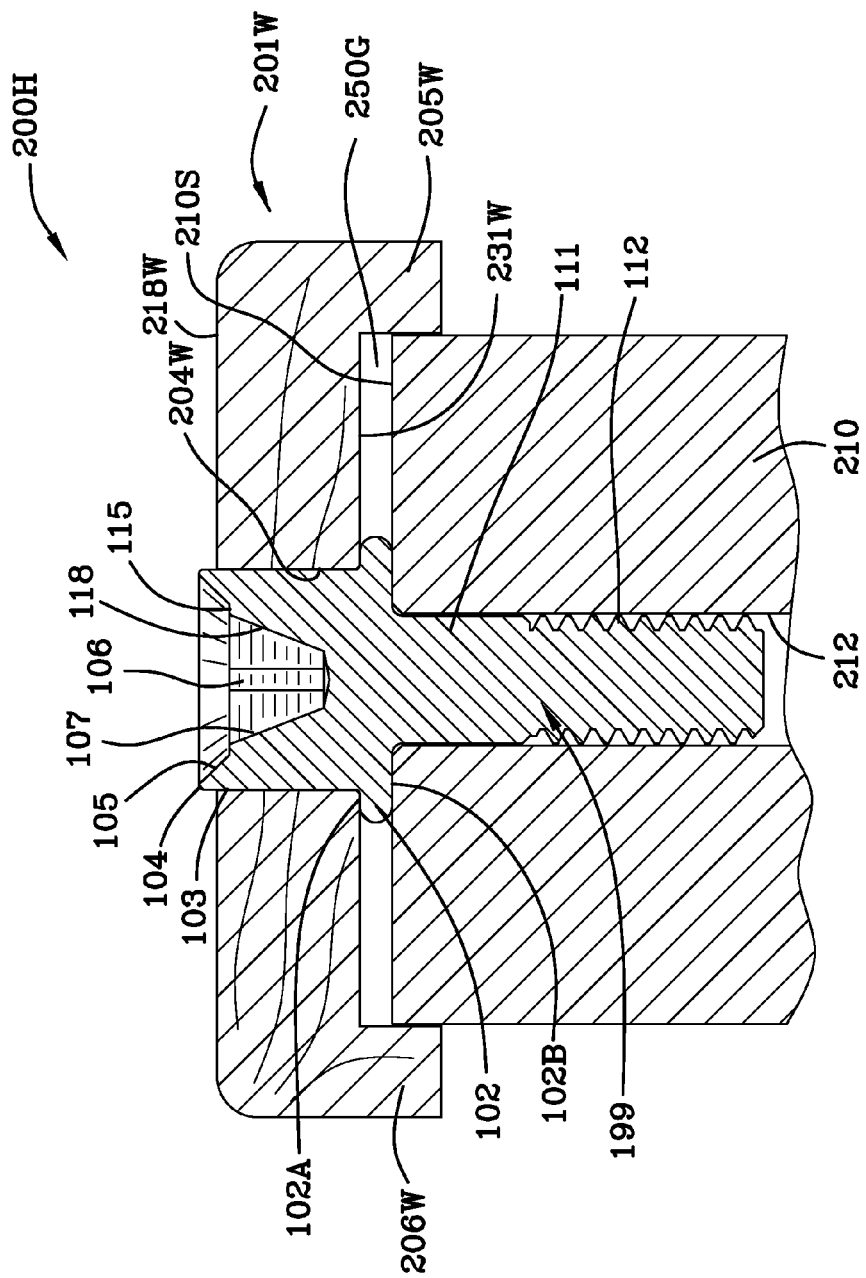
FIG. 2H is a cross-sectional view similar to FIG. 2D illustrating the wood attachment, the bore completely through the wood attachment, the upper cylindrical portion of the rivet bolt in the bore, and, the upper cylindrical portion protruding slightly from the top surface of the attachment.
Figure 2I:
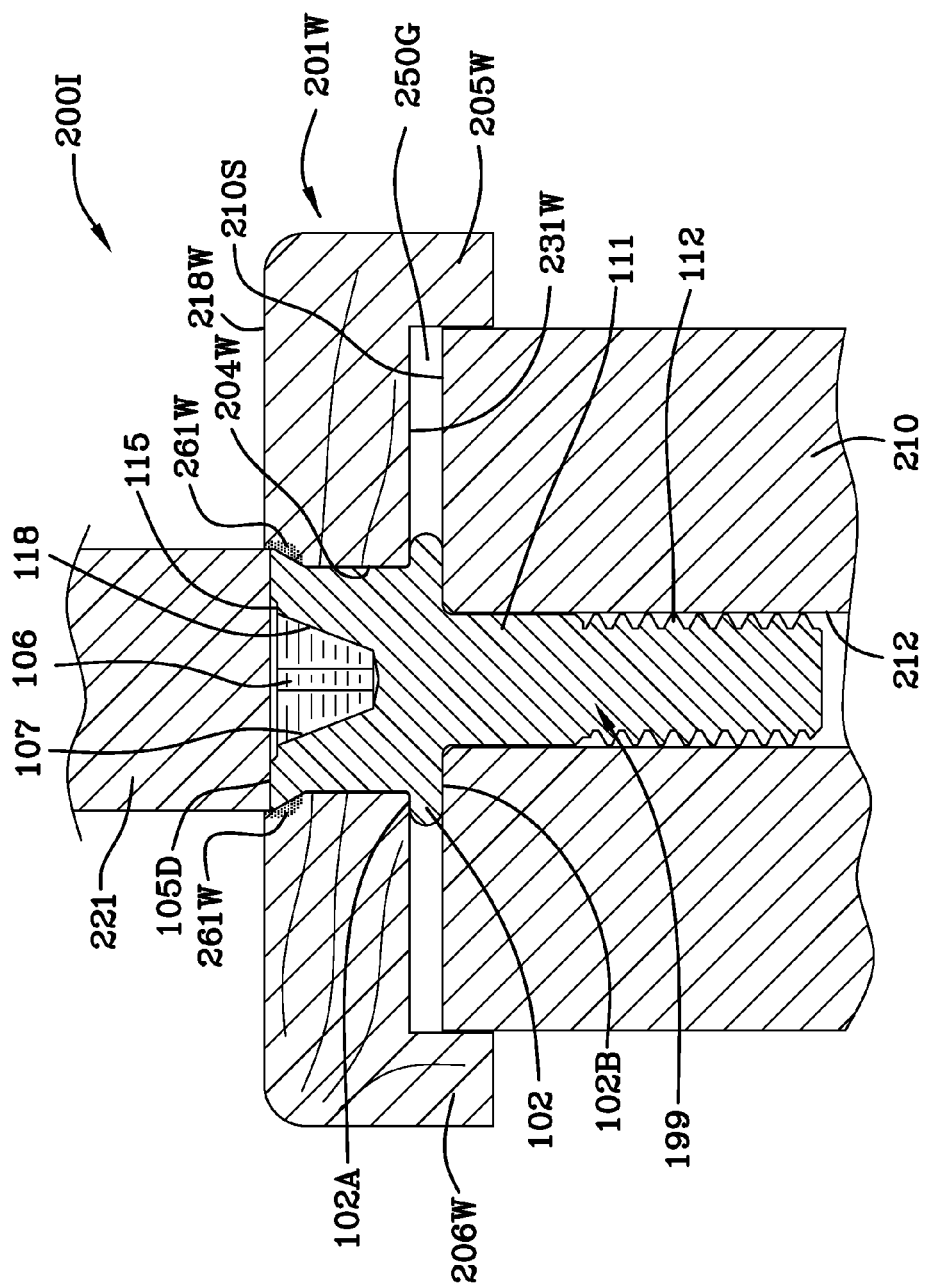
FIG. 2I is a cross-sectional view similar to FIG. 2H illustrating the punch engaging and deforming the upper cylindrical portion of the rivet bolt into the surrounding wood.

FIG. 2G is an exploded perspective view 200G of the rivet bolt 199 in position for affixation to a wooden attachment 201W wherein bore 204W extends completely through the attachment. Bore 204W is completely cylindrical and does not include a countersink or a countersunk bore. Legs 205W, 206W are illustrated on end 207W of the attachment 201W and the top surface 218W is also illustrated in FIG. 2G. As stated herein elsewhere, the attachment can also be referred to as a cap or a sill. FIG. 2H is a cross-sectional view 200H similar to FIG. 2D illustrating the wood attachment 201, the bore 204W completely through the wood attachment 201W, and the rivet bolt in the bore 201W, and, the rivet bolt 199 protrudes slightly above top surface 218W of the attachment. Bottom 231W of the attachment 201W and top surface of 210S secure flange 102 in place as described hereinabove in connection with FIGS. 2D and 2E. FIG. 2I is a cross-sectional view 200I similar to FIG. 2H illustrating the punch 221 engaging the rivet bolt as described above and deforming 105D the upper cylindrical portion 103 of the rivet bolt 199 into the surrounding wood 261W. Unnumbered dots indicate deformation of the wood in the surrounding wood 261W. When the metal is deformed 105D into the wooden attachment 201W, the attachment 201W is relatively soft as compared to the metal of the rivet bolt, and, thus, the wood of the substrate is deformed. However, the deformation of the wood 261W does not prevent the rivet bolt 1999 from rotating such that the threaded portion 112 of the shaft 111 can later be connected to a t-nut or other locking device embedded in a separate substrate or device. Rivet bolt 199 is able to slidingly rotate with respect to the wooden attachment 201W. The arrangement for connection to another device is illustrated in U.S. Pat. No. 6,185,870. The deformation 105D of the rivet bolt 199 secures the rivet bolt to the wooden attachment 201W such that it cannot move along axis A as described herein. In other words, the rivet bolt can rotate but it cannot move along the axis A as illustrated in FIGS. 2 and 2G.

Figure 2J:
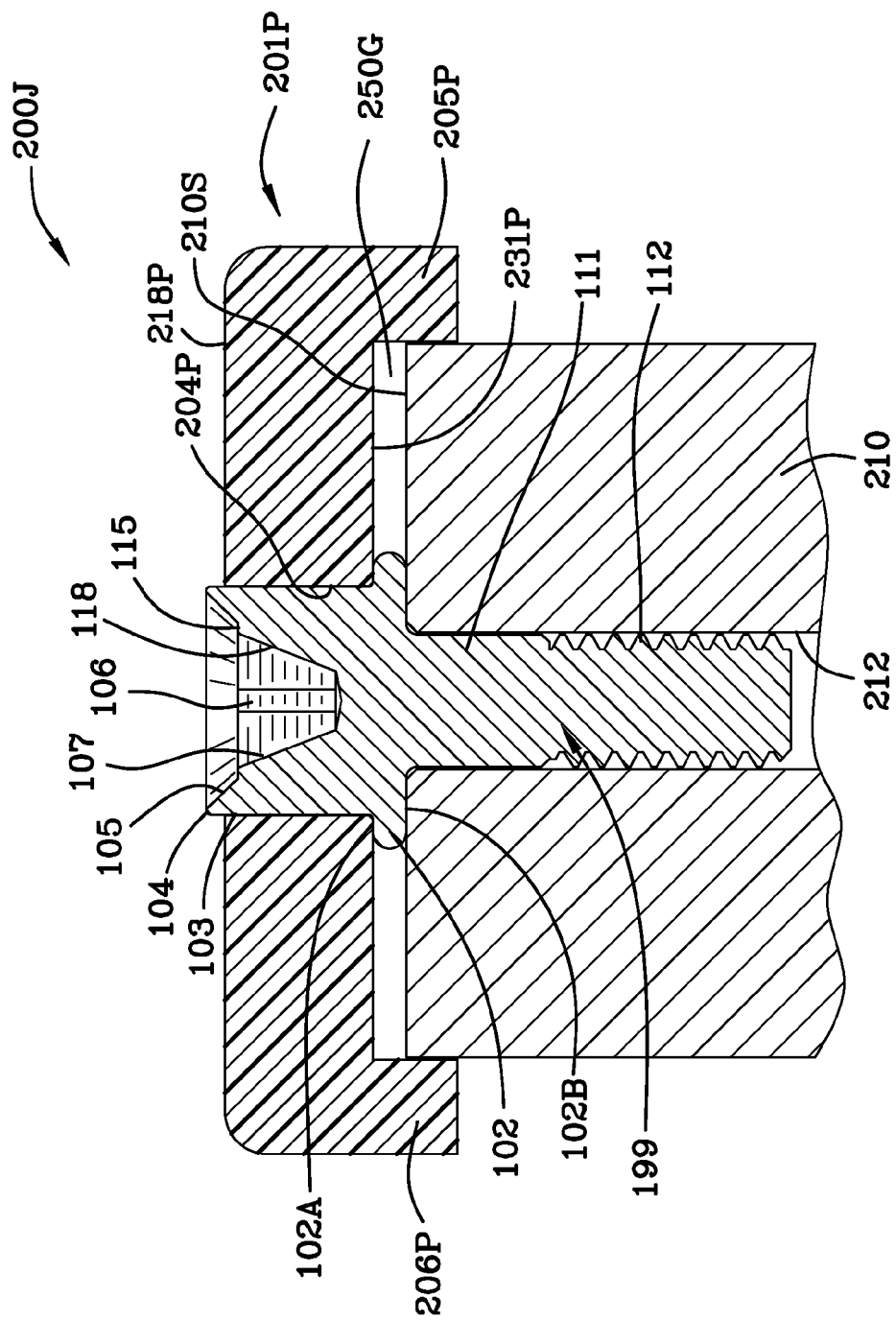
FIG. 2J is a cross-sectional view similar to FIGS. 2D and 2H illustrating the plastic attachment, the bore completely through the plastic attachment, the upper cylindrical portion of the rivet bolt in the bore, and, the upper cylindrical portion protruding slightly form the top surface of the attachment.
Figure 2K:
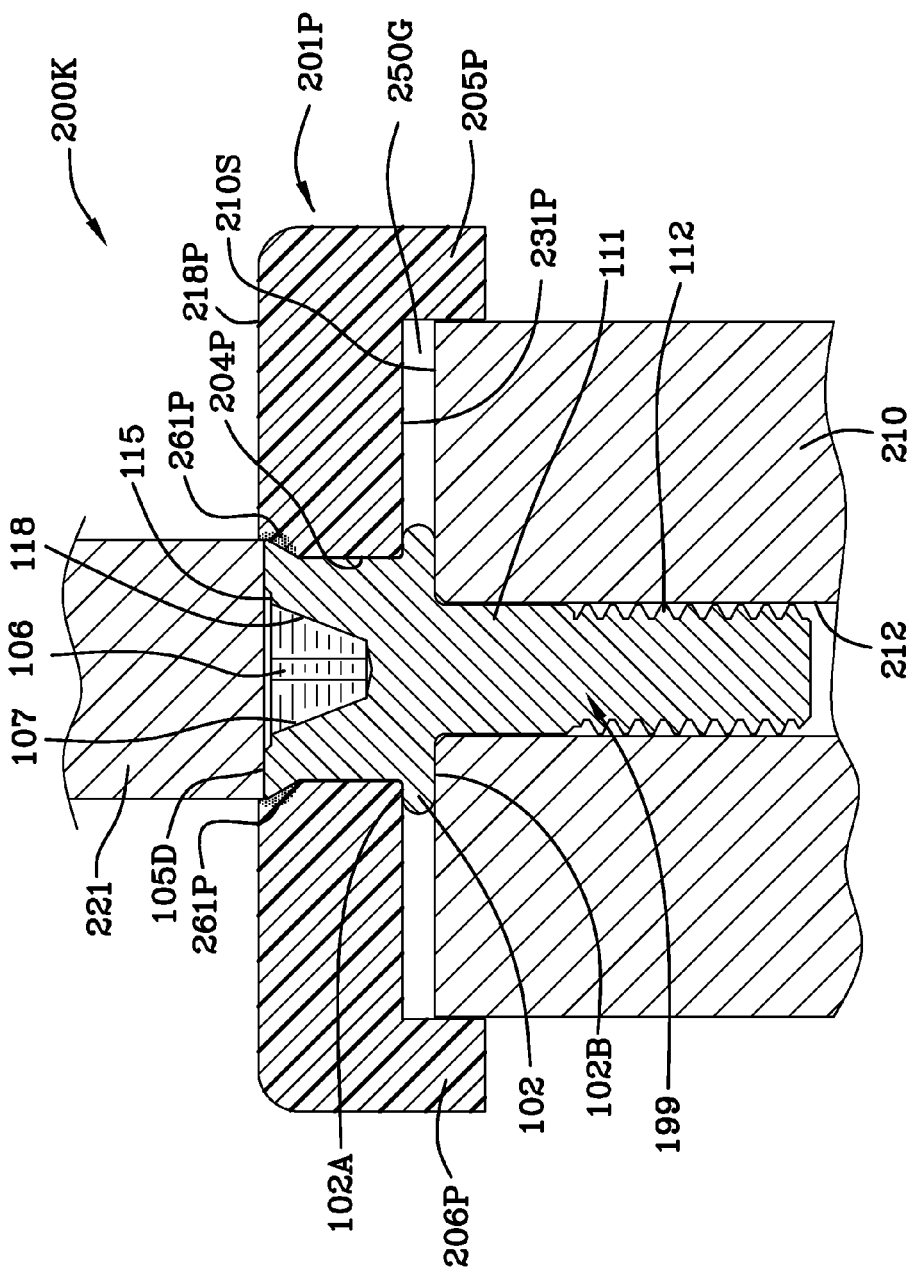
FIG. 2K is a cross-sectional view similar to FIG. 2J illustrating the punch engaging and deforming the upper cylindrical portion of the rivet bolt into the surrounding plastic.

FIG. 2J is a cross-sectional view 200J similar to FIGS. 2D and 2H illustrating the plastic attachment 201P, the bore 204P completely through the plastic attachment, the rivet bolt 199 in the bore 204P, and, the upper cylindrical portion of the rivet bolt protruding slightly above top surface 218P of the attachment 201P. Bottom 231P of the attachment 201P and top surface of 210S secure flange 102 in place as described hereinabove in connection with FIGS. 2D and 2E. FIG. 2K is a cross-sectional view 200K similar to FIG. 2J illustrating the punch 221 engaging and deforming 261P the upper cylindrical portion 103 of the rivet bolt 199 into the surrounding plastic. Unnumbered dots indicate deformation of the plastic in the portion indicated by reference numeral 261P. When the metal of the rivet bolt is deformed 105D into the plastic attachment 201P, the attachment is also deformed as it is relatively soft as compared to the metal. However, the deformation of the plastic 201P does not prevent the rivet bolt 199P from rotating such that the threaded portion 112 of the shaft 111 can later be connected to a t-nut or other locking device embedded in a separate substrate or device. Rivet bolt 199 is able to slidingly rotate with respect to the wooden attachment 201P. The arrangement for connection to another device is illustrated in U.S. Pat. No. 6,185,870. As illustrated in FIG. 2K, rivet bolt 199 may not move along axis A as illustrated in FIG. 2G.

Figure 3:
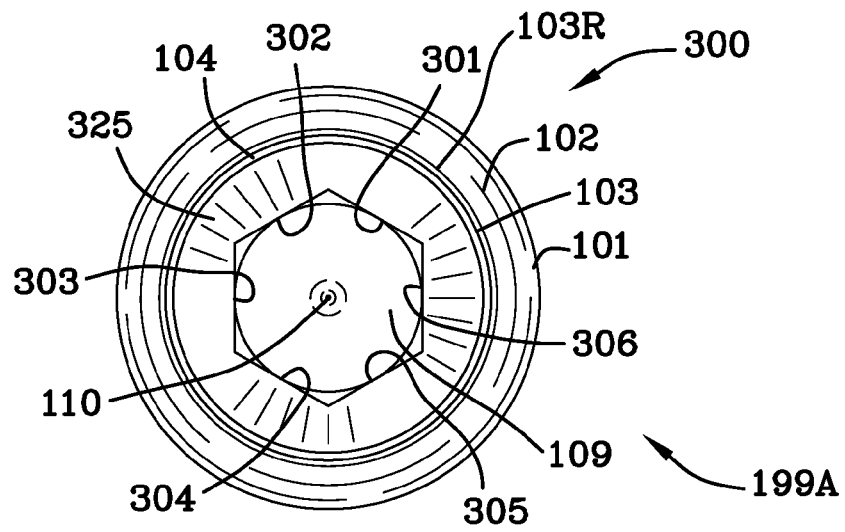
FIG. 3 is a top view of a second example of the rivet bolt illustrating an upper cylindrical portion having an interior thereof which is hexagonally shaped.

FIGS. 3, 3A, 3B, 3C and 3D represents a second embodiment or example of the rivet bolt 199A. The example of rivet bolt 199A has several structural features which are common with the example or embodiment set forth in FIGS. 1, 1A, 1B, 1C, 1D and, as such, the structures which are common will not be described again. FIG. 3 is a top view 300 of the rivet bolt 199A illustrating an upper cylindrical portion 103 having an interior thereof which is hexagonally shaped. FIG. 3 illustrates inverted frusto-conical surface 325 which extends from the upper edge 104 of the cylindrical upper portion 103 to hexagonal interior surfaces 301, 302, 303, 304, 305 and 306. Deformed inverted frusto-conical surface 325D is best viewed in FIGS. 3C and 3D.

Figure 3A:
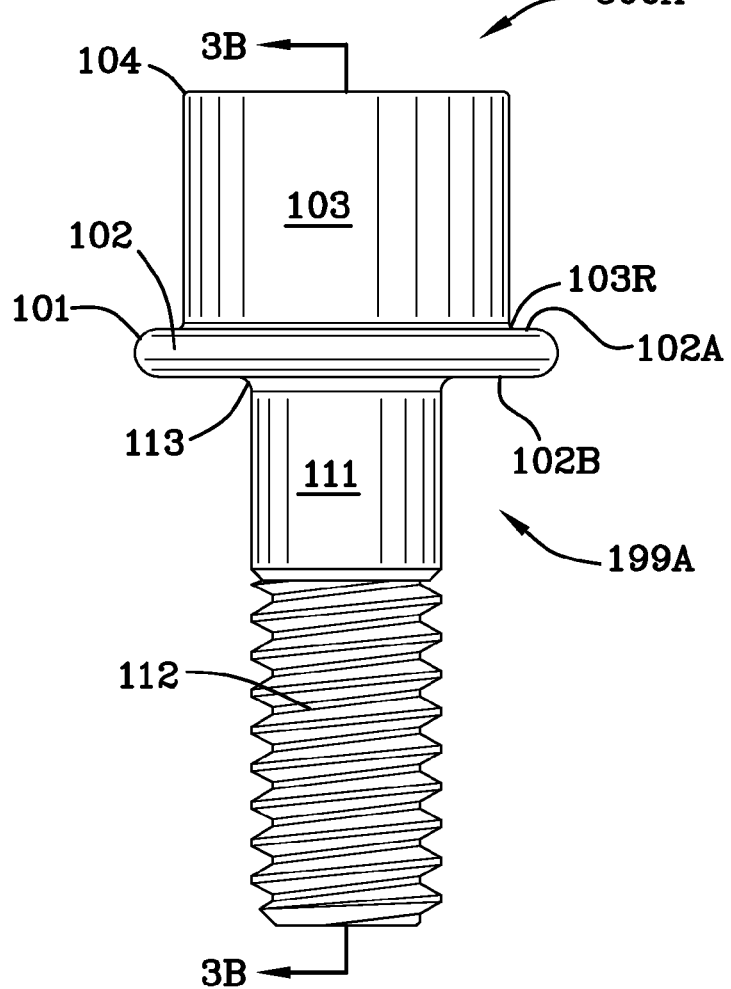
FIG. 3A is a side view of the rivet bolt of FIG. 3.
Figure 3B:
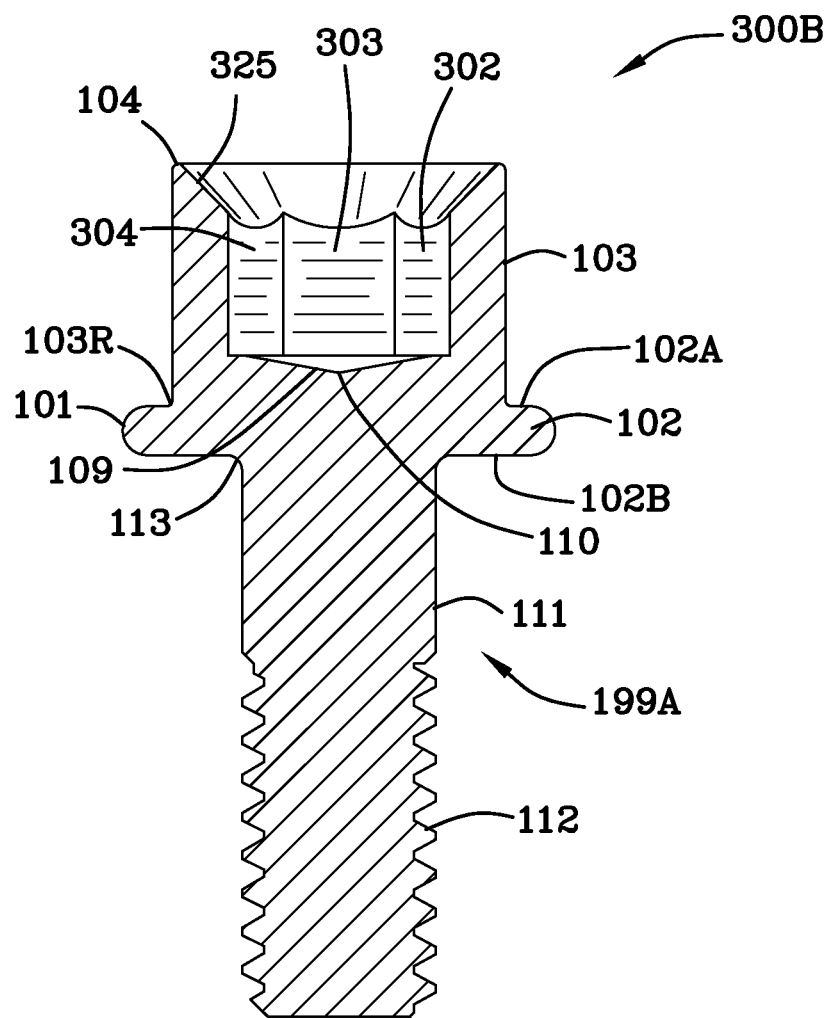
FIG. 3B is cross-sectional view of the rivet bolt taken along the lines 3B-3B of FIG. 3A.

Hexagonal interior surfaces 301, 302, 303, 304, 305 and 306 are illustrated in FIG. 3. FIG. 3A is a side view 300A of the rivet bolt 199A. FIG. 3B is cross-sectional view 300B of the rivet bolt 199A taken along the lines 3B-3B of FIG. 3A. A hexagonal socket driver (not shown) detachably mates with the hexagonal surfaces 301, 302, 303, 304, 305 and 306 and rotates the rivet bolt 199A. Although not shown, the upper cylindrical portion 103 may be covered with a zinc or black oxide coating.

Figure 3C:
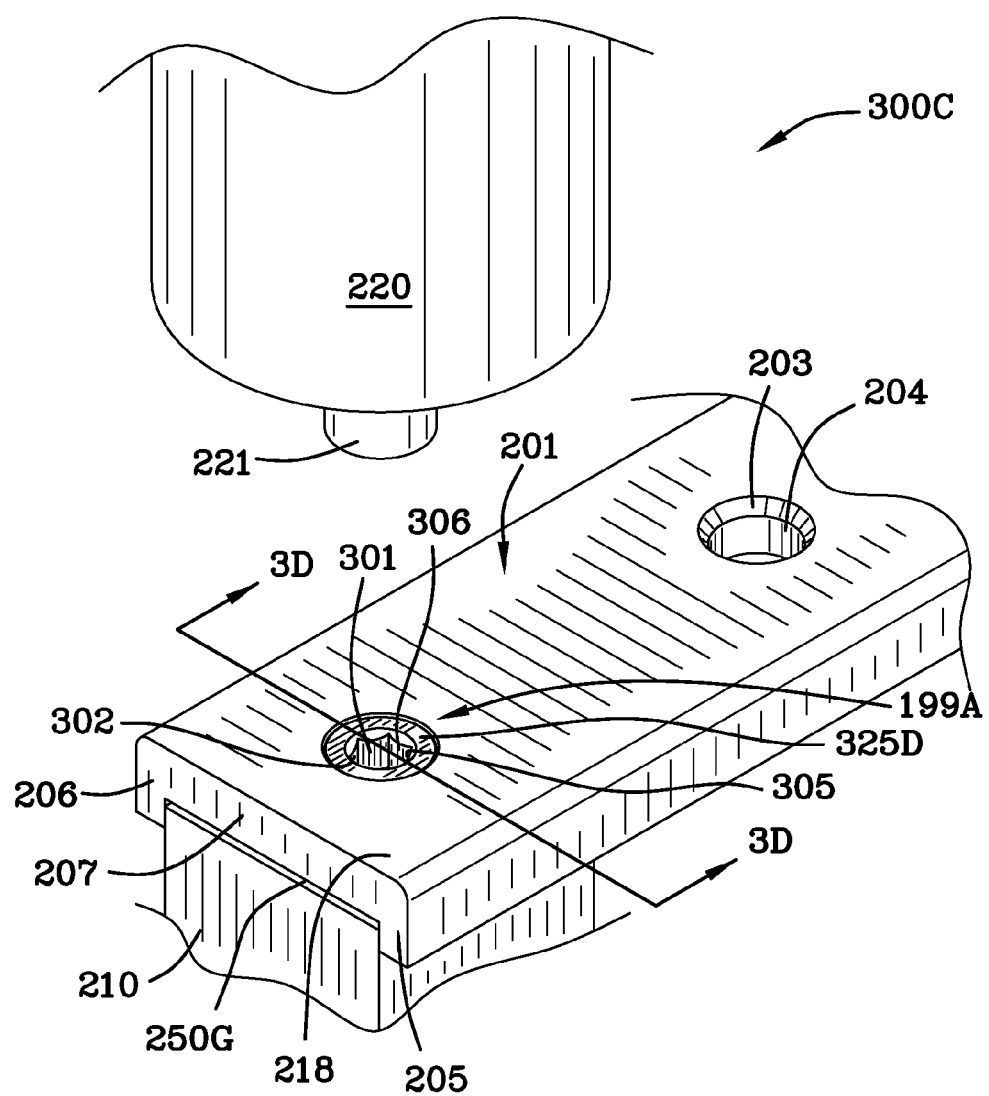
FIG. 3C is a perspective view of the rivet bolt deformed in the attachment with the interior hexagonal surfaces illustrated.
Figure 3D:
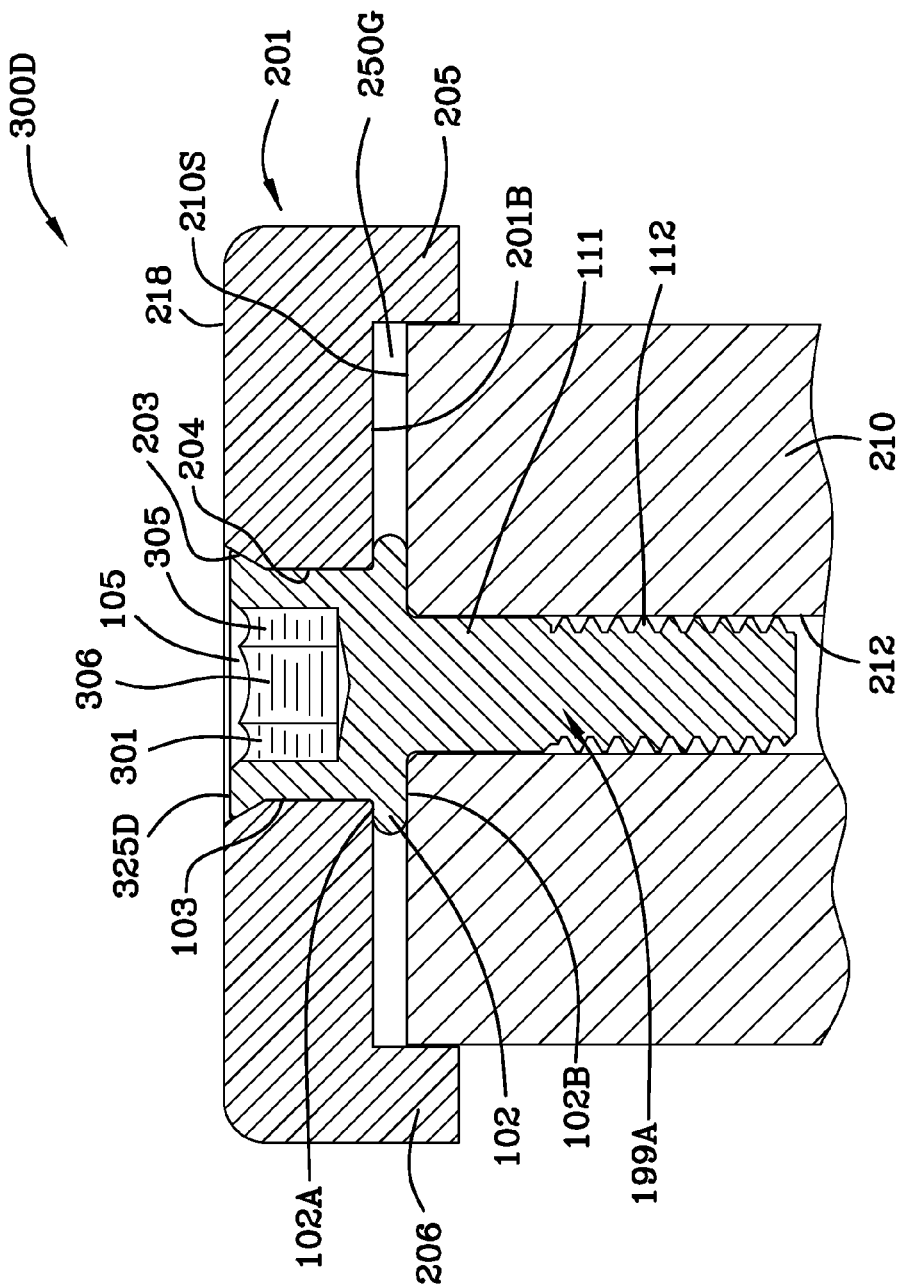
FIG. 3D is a cross-sectional view taken along the lines 3D-3D of FIG. 3C illustrating the deformed inverted frusto-conical surface which extends into the inverted frusto-conical surface of the metal attachment.

FIG. 3C is a perspective view 300C of the rivet bolt 199A deformed in the attachment 201 with the interior hexagonal surfaces 301, 302, 305 and 306 illustrated. FIG. 3D is a cross-sectional view 300D taken along the lines 3D-3D of FIG. 3C illustrating the deformed inverted frusto-conical surface 325D which extends into the inverted frusto-conical surface 203 in the attachment 201. An unnumbered portion of surface 325 is illustrated sloping inwardly after deformation of the upper cylindrical portion and surface 325.

FIG. 3D clearly illustrates the rivet bolt 199A secured to the attachment 201. The inverted frusto-conical surface 325D is deformed substantially into the inverted frusto-conical surface 203 of the attachment, however, the deformation of the rivet bolt 199A does not prevent the rivet bolt 199A from rotating with respect to the attachment 201. Upper cylindrical portion 103 of the rivet bolt 199A, after deformation, fits within the bore 204 of attachment 201 and fits within the inverted frusto conical surface 203 of the attachment 201 such that it is rotatable with respect to the bore 204. Rivet bolt 199A must be rotatable because as it is designed to be fastened to a structure that is not shown.

Figure 4:
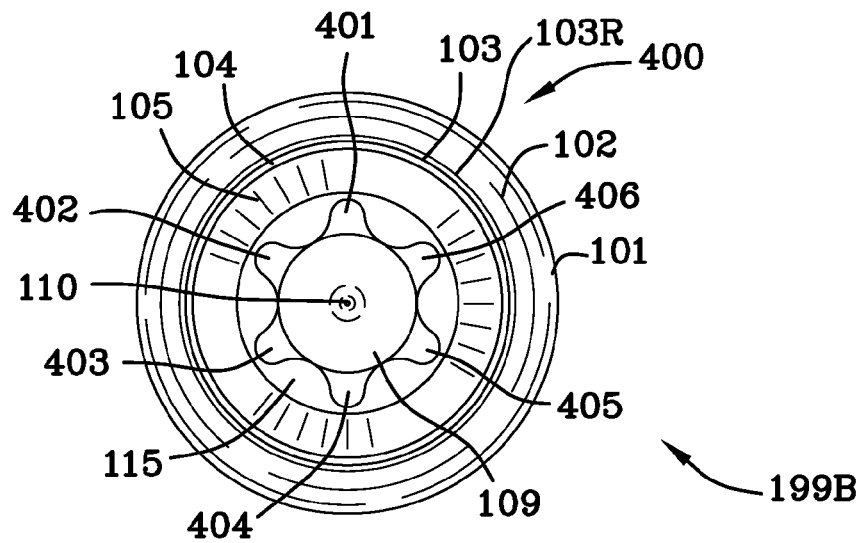
FIG. 4 is a top view of a third example of the rivet bolt illustrating an upper cylindrical portion having an interior thereof which is torx shaped for mating with a torx driver.

FIG. 4 is a top view 400 of a third embodiment or example of the rivet bolt 199B. The example of rivet bolt 199B has several structural features which are common with the example or embodiment set forth in FIGS. 1, 1A, 1B, 1C, 1D and, as such, the structures which are common will not be described again. FIG. 4 is a top view 400 of the rivet bolt 199B illustrating an upper cylindrical portion 103 having an interior thereof which is torx shaped. FIG. 4 illustrates inverted frusto-conical surface 105 which extends from the upper edge 104 of the cylindrical upper portion 103 to interior base surface 115. Deformed inverted frusto-conical surface 105D is best viewed in FIG. 4D.

Figure 4A:
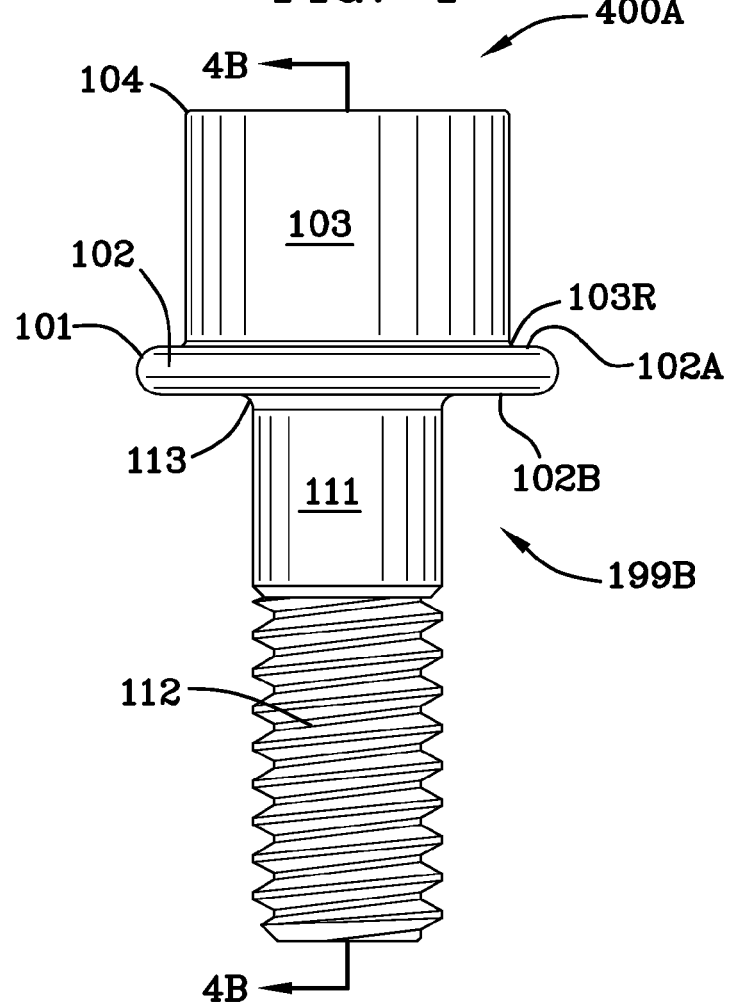
FIG. 4A is a side view of the rivet bolt of FIG. 4.
Figure 4B:
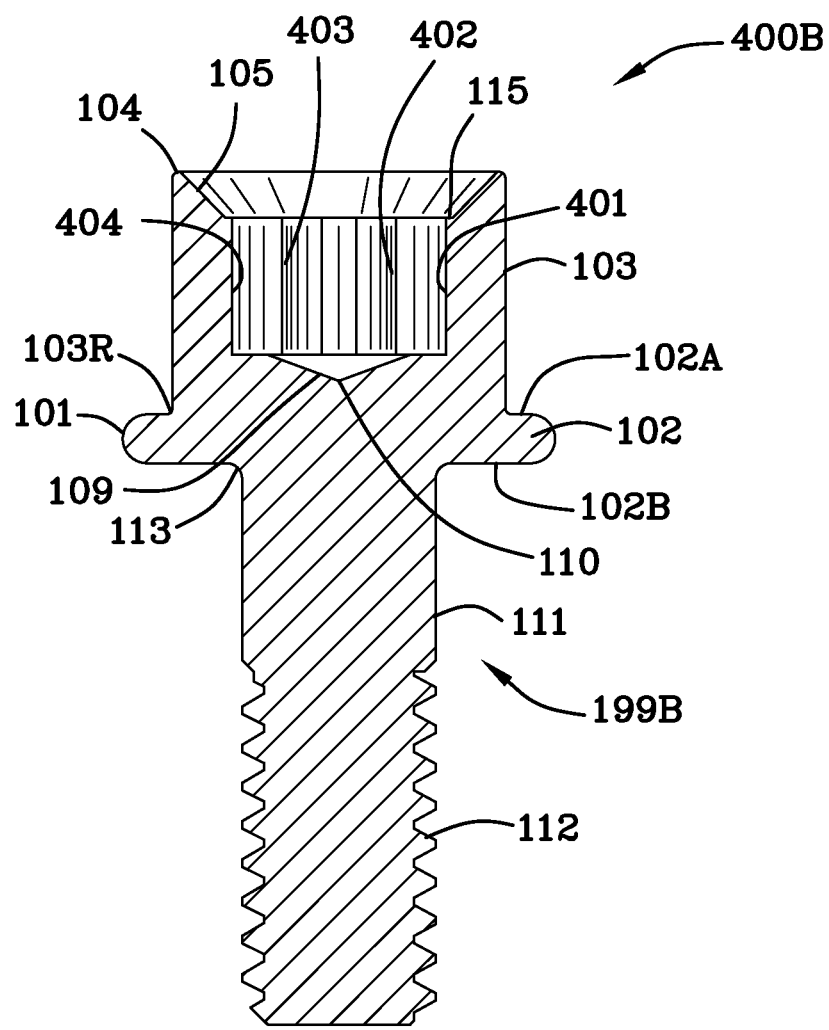
FIG. 4B is cross-sectional view of the rivet bolt taken along the lines 4B-4B of FIG. 4A.

FIG. 4B is cross-sectional view 400B of the rivet bolt 199B taken along the lines 4B-4B of FIG. 4A. FIG. 4A is a side view 400A of the rivet bolt 199B. A torx socket driver (not shown) detachably mates with the surfaces 401, 402, 403, 404, 405 and 406 and rotates the rivet bolt 199B. Although not shown, the upper cylindrical portion 103 may be covered with a zinc or black oxide coating.

Figure 4C:
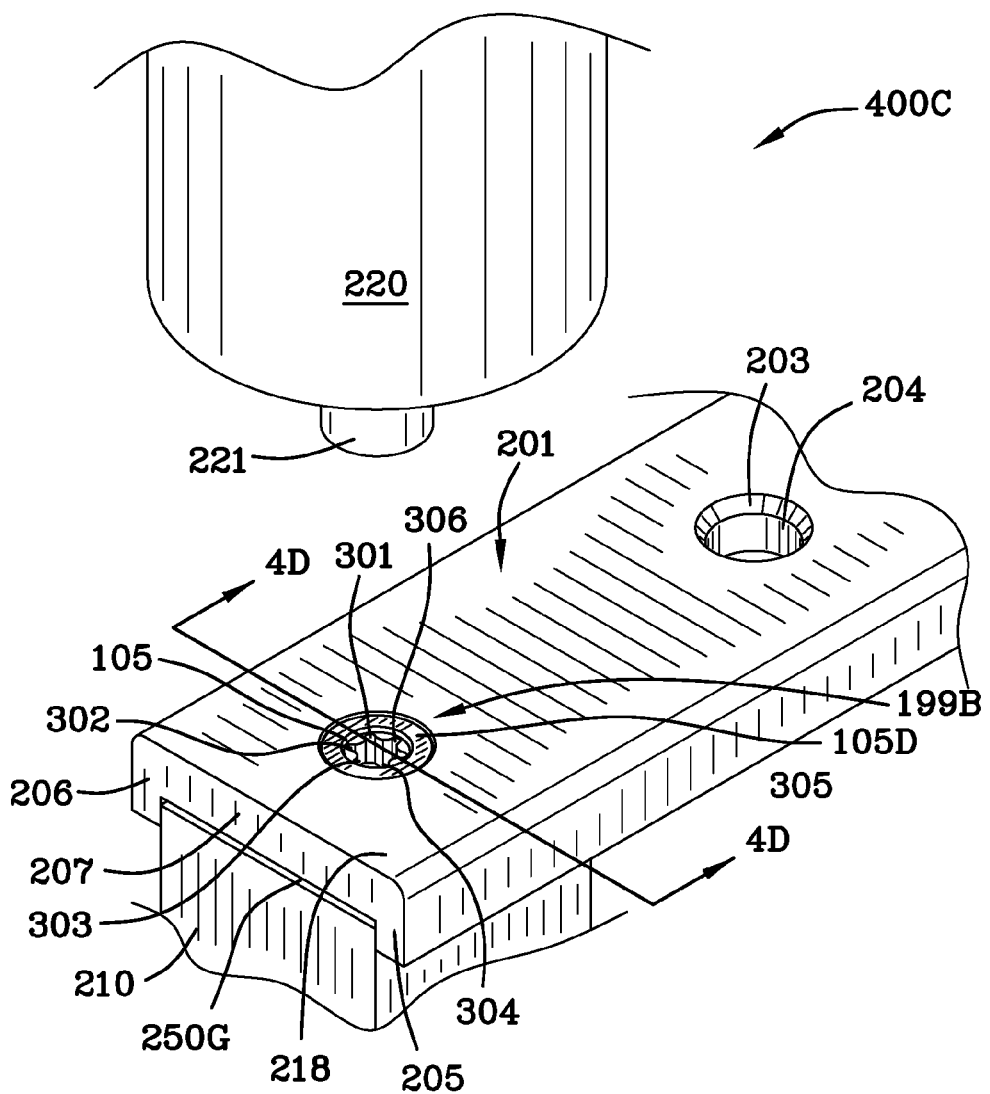
FIG. 4C is a perspective view of the rivet bolt deformed in the attachment.
Figure 4D:
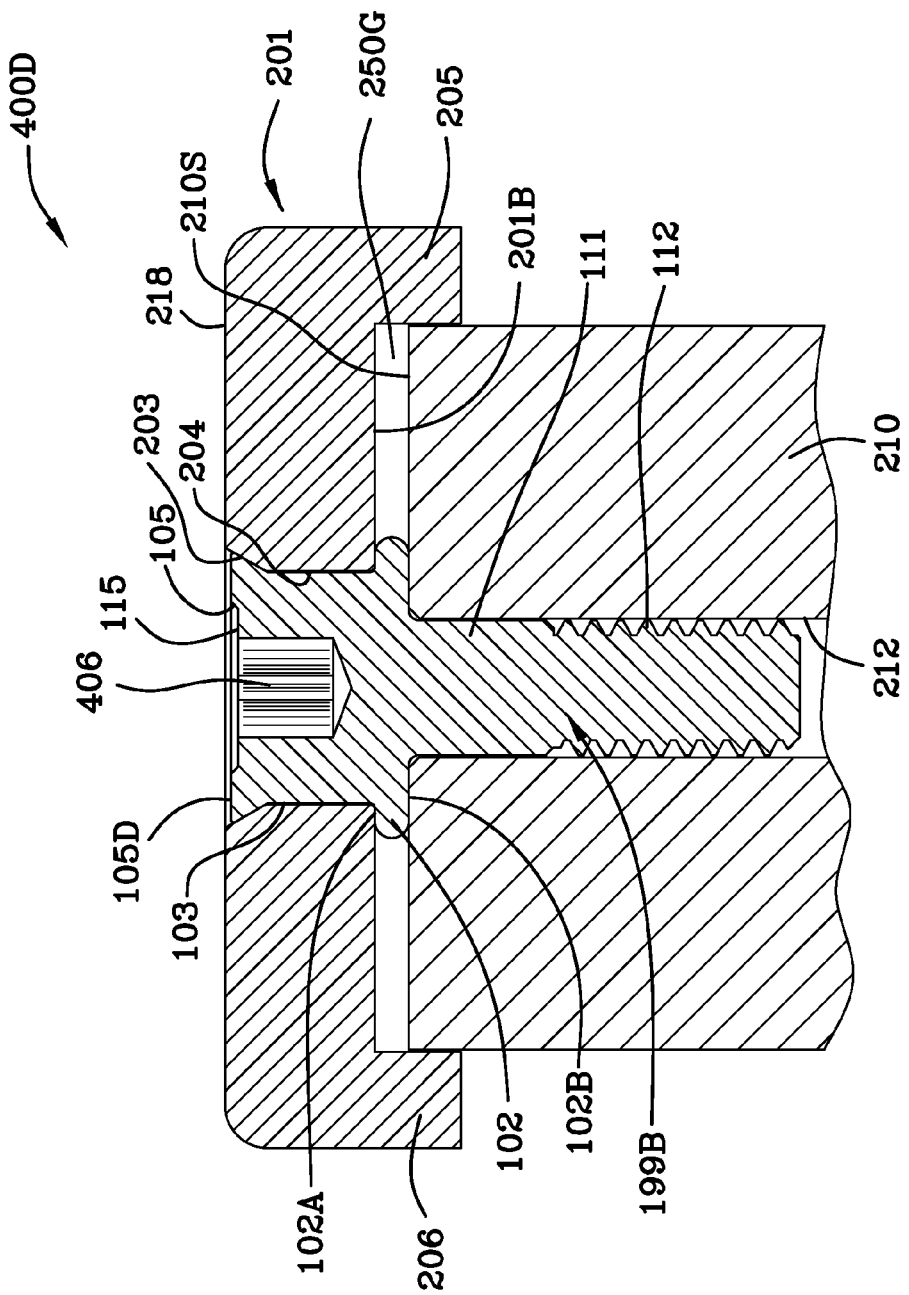
FIG. 4D is a cross-sectional view taken along the lines 4D-4D of FIG. 4C illustrating the deformed inverted frusto-conical surface which extends into the inverted frusto-conical surface of the metal attachment.

FIG. 4C is a perspective view 400C of the rivet bolt 199B deformed in the attachment 201 with the interior torx surfaces 401, 402, 403 and 406 illustrated. FIG. 4D is a cross-sectional view 400D taken along the lines 4D-4D of FIG. 4C illustrating the deformed inverted frusto-conical surface 105D which extends into the inverted frusto-conical surface 203 of the attachment 201.

FIG. 4D clearly illustrates the rivet bolt 199B secured to the attachment 201. The inverted frusto-conical surface 105D is deformed substantially into the inverted frusto-conical surface 203 of the attachment, however, the deformation of the rivet bolt 199B does not prevent the rivet bolt 199B from rotating with respect to the attachment 201. Upper cylindrical portion 103 of the rivet bolt 199B, after deformation, fits within the bore 204 of attachment 201 and first within the inverted frusto-conical surface 203 of the attachment 201 such that rivet bolt 199B is rotatable with respect to the bore 204. Rivet bolt 199B must be rotatable as threads 112 engage a nut to fasten to a structure that is not shown. In other words the nut may be a t-nut inserted into the bore of another structure or device which is not shown. See, U.S. Pat. No. 6,185,870 which is incorporated herein in its entirety by reference hereto.

Figure 5:
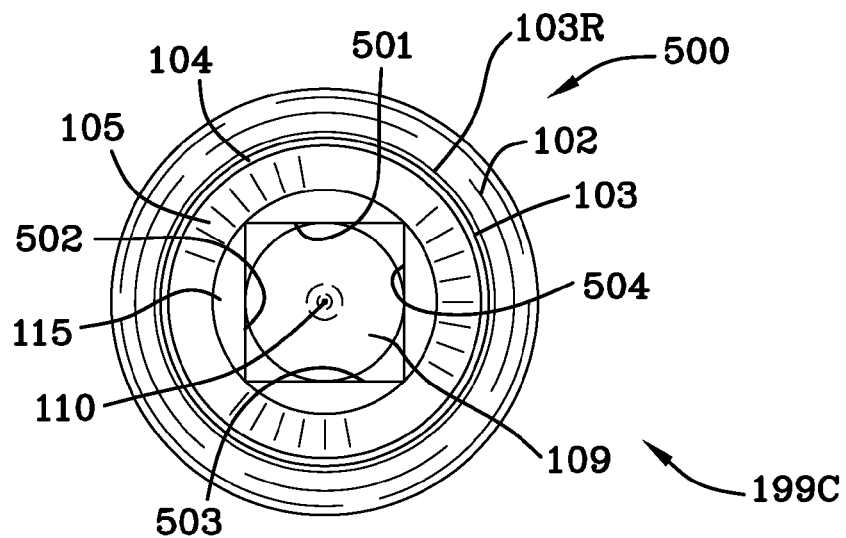
FIG. 5 is a top view of a fourth embodiment or example of the rivet bolt.

FIG. 5 is a top view 500 of a fourth embodiment or example of the rivet bolt 199C. The example of rivet bolt 199C has several structural features which are common with the example or embodiment set forth in FIGS. 1, 1A, 1B, 1C, 1D and, as such, the structures which are common will not be described again. FIG. 5 is a top view 500 of the rivet bolt 199C illustrating an upper cylindrical portion 103 having an interior thereof which is square shaped. Surfaces 501, 502, 503, and 504 are illustrated in FIG. 5.

FIG. 5 illustrates inverted frusto-conical surface 105 which extends from the upper edge 104 of the cylindrical upper portion 103 to interior base surface 115. Deformed inverted frusto-conical surface 105D is best viewed in FIG. 5D.

Figure 5A:
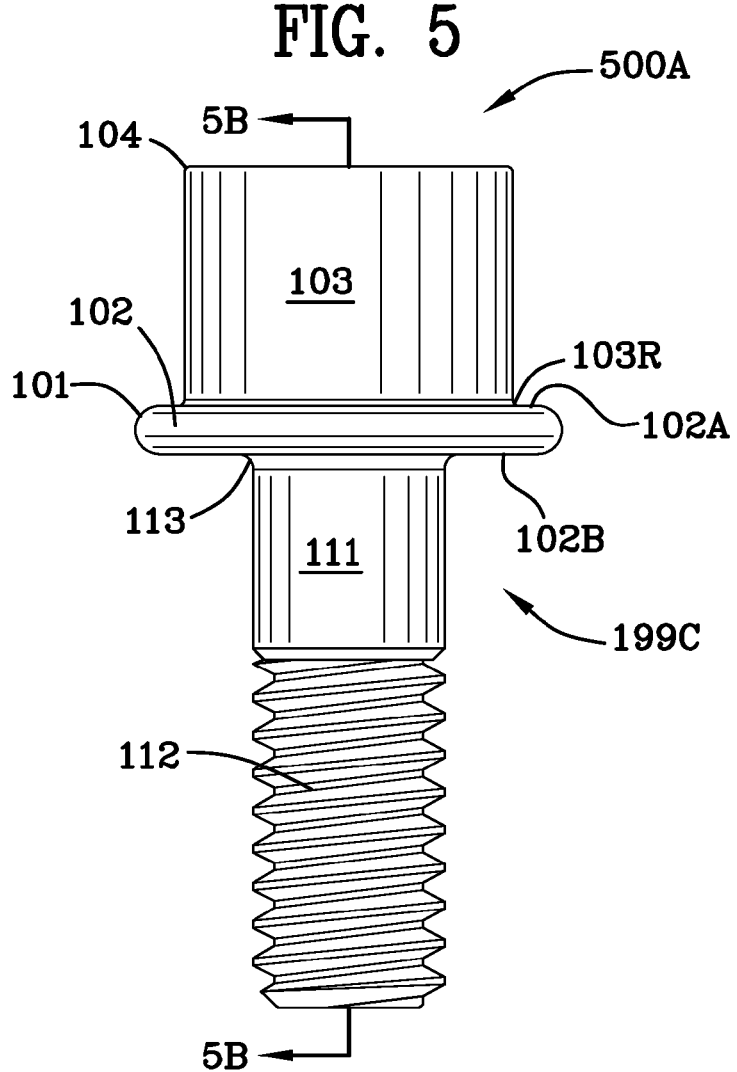
FIG. 5A is a side view of the rivet bolt of FIG. 5.
Figure 5B:
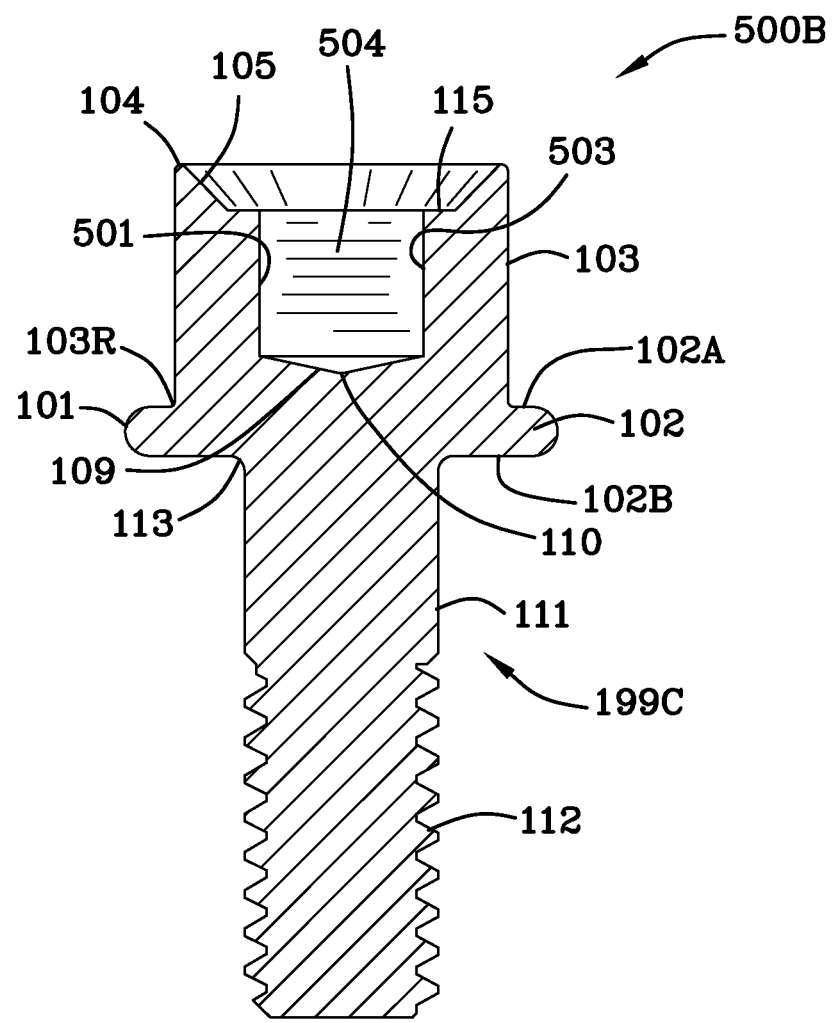
FIG. 5B is cross-sectional view of the rivet bolt taken along the lines 5B-5B of FIG. 5A.

FIG. 5B is cross-sectional view 500B of the rivet bolt 199C taken along the lines 5B-5B of FIG. 5A. FIG. 5A is a side view 500A of the rivet bolt 199C. A square socket driver (not shown) detachably mates with the surfaces 501, 502, 503, and 504 and rotates the rivet bolt 199C. Although not shown, the upper cylindrical portion 103 may be covered with a zinc or black oxide coating.

Figure 5C:
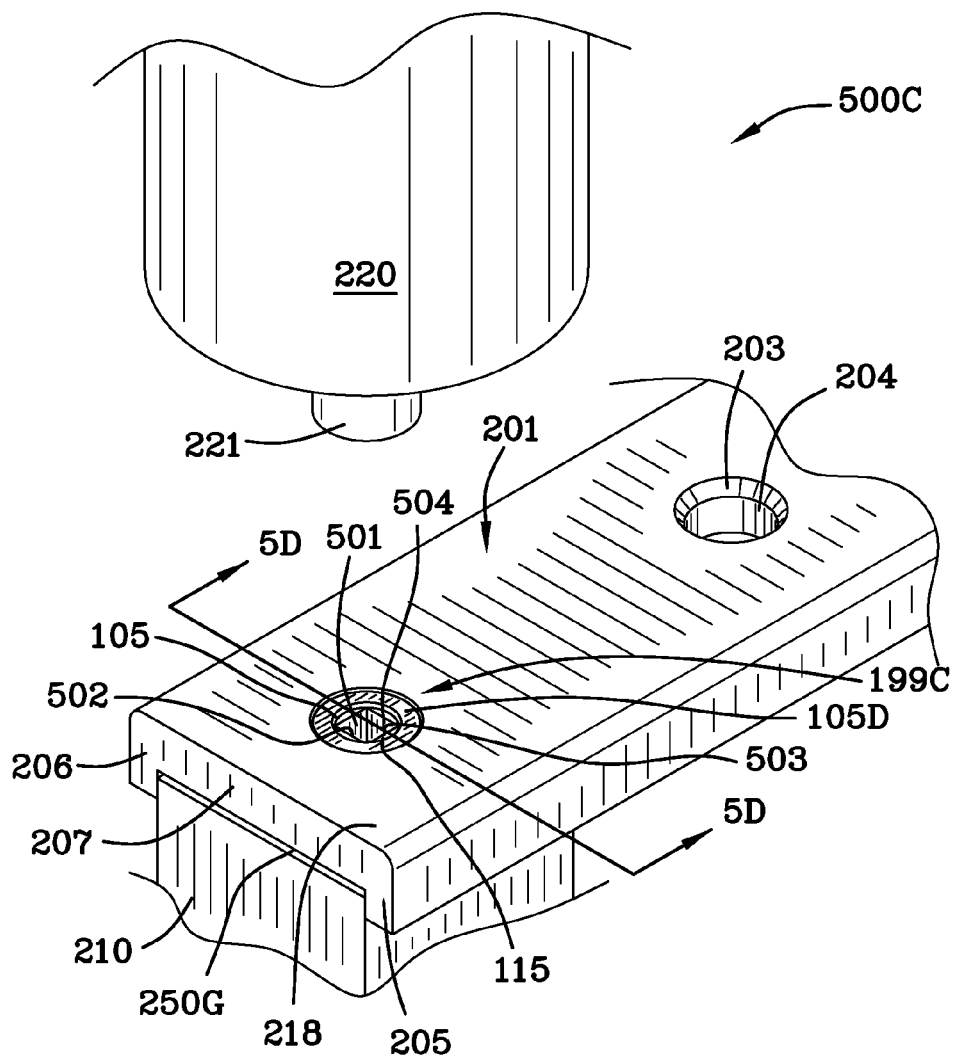
FIG. 5C is a perspective view of the rivet bolt deformed in the attachment with the interior square surfaces illustrated.
Figure 5D:
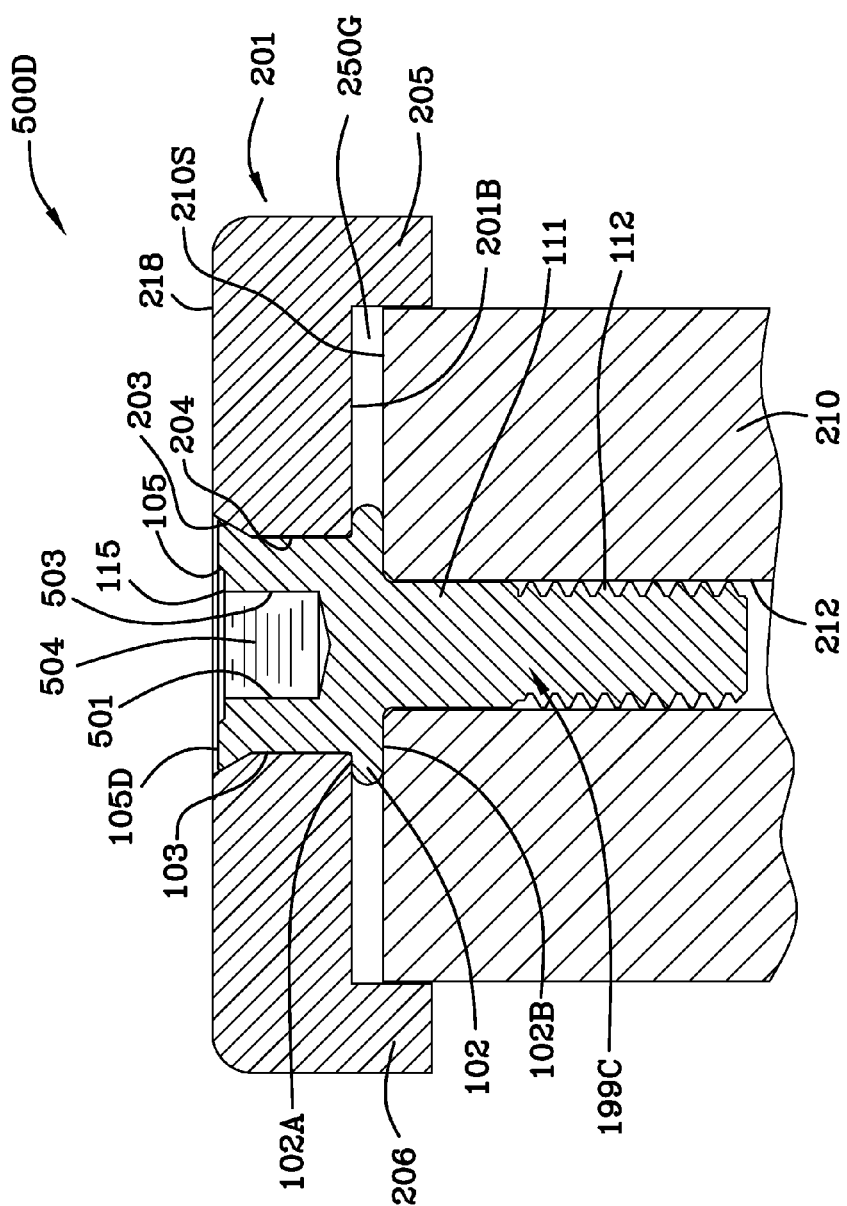
FIG. 5D is a cross-sectional view taken along the lines 5D-5D of FIG. 5C illustrating the deformed inverted frusto-conical surface which extends into the inverted frusto-conical surface of the metal attachment.

FIG. 5C is a perspective view 500C of the rivet bolt 199C deformed in the attachment 201 with the interior square surfaces 501, 502, 503 and 504 illustrated. FIG. 5D is a cross-sectional view 500D taken along the lines 5D-5D of FIG. 5C illustrating the deformed inverted frusto-conical surface 105D which extends into the inverted frusto-conical surface 203 of the attachment 201.

FIG. 5D clearly illustrates the rivet bolt 199C secured to the attachment 201. The inverted frusto-conical surface 105D is deformed substantially into the inverted frusto-conical surface 203 of the attachment, however, the deformation of the rivet bolt 199C does not prevent the rivet bolt 199C from rotating with respect to the attachment 201. Upper cylindrical portion 103 of the rivet bolt 199C, after deformation, fits within the bore 204 of attachment 201 and fits within the inverted frusto conical surface 203 of the attachment 201 such that rivet bolt 199C is rotatable with respect to the bore 204. Rivet bolt 199C must be rotatable as threads 112 engage a nut to fasten to a structure that is not shown.

Figure 6:
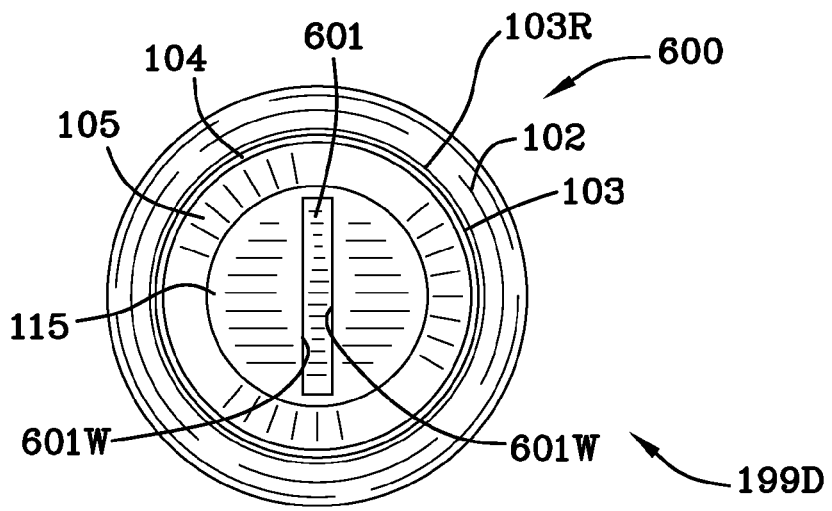
FIG. 6 is a top view of a fifth embodiment or example of the rivet bolt.

FIG. 6 is a top view 600 of a fifth embodiment or example of the rivet bolt 199D. The example of rivet bolt 199D has several structural features which are common with the example or embodiment set forth in FIGS. 1, 1A, 1B, 1C, 1D and, as such, the structures which are common will not be described again. FIG. 6 is a top view 600 of the rivet bolt 199D illustrating an upper cylindrical portion 103 having an interior thereof which is slot shaped 601. Slot 601 includes walls 601W which form the slot. FIG. 6 illustrates inverted frusto-conical surface 105 which extends from the upper edge 104 of the cylindrical upper portion 103 to interior base surface 115. Deformed inverted frusto-conical surface 105D is best viewed in FIG. 6D.

Figure 6A:
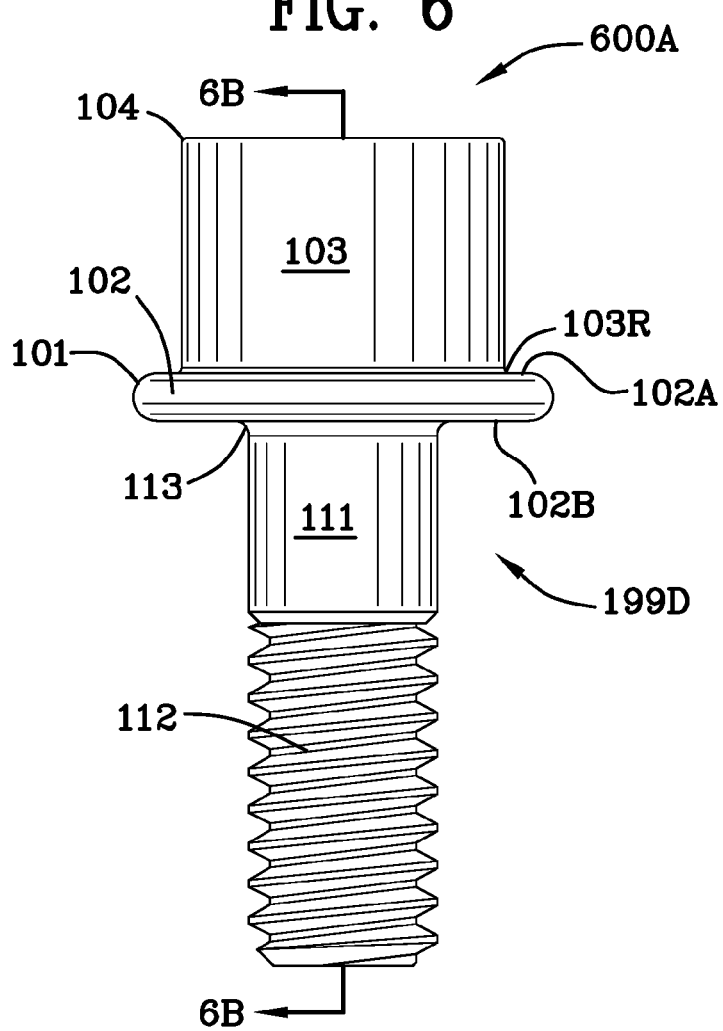
FIG. 6A is a side view of the rivet bolt of FIG. 6.
Figure 6B:
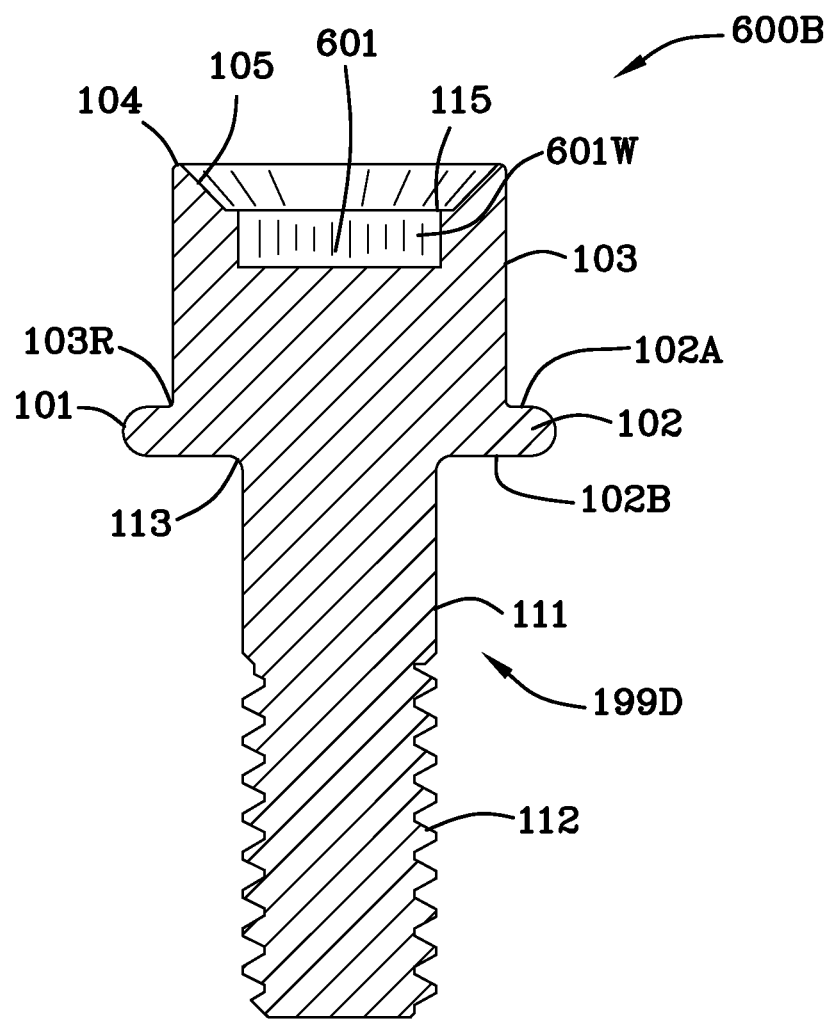
FIG. 6B is cross-sectional view of the rivet bolt taken along the lines 6B-6B of FIG. 6A.

FIG. 6B is a cross-sectional view 600B of the rivet bolt 199D taken along the lines 6B-6B of FIG. 6A. FIG. 6A is a side view 600A of the rivet bolt 199D. A slot socket driver (not shown) detachably mates with the surfaces 601W and rotates the rivet bolt 199D. Although not shown, the upper cylindrical portion 103 may be covered with a zinc or black oxide coating as was described above in connection with FIG. 1C.

Figure 6C:
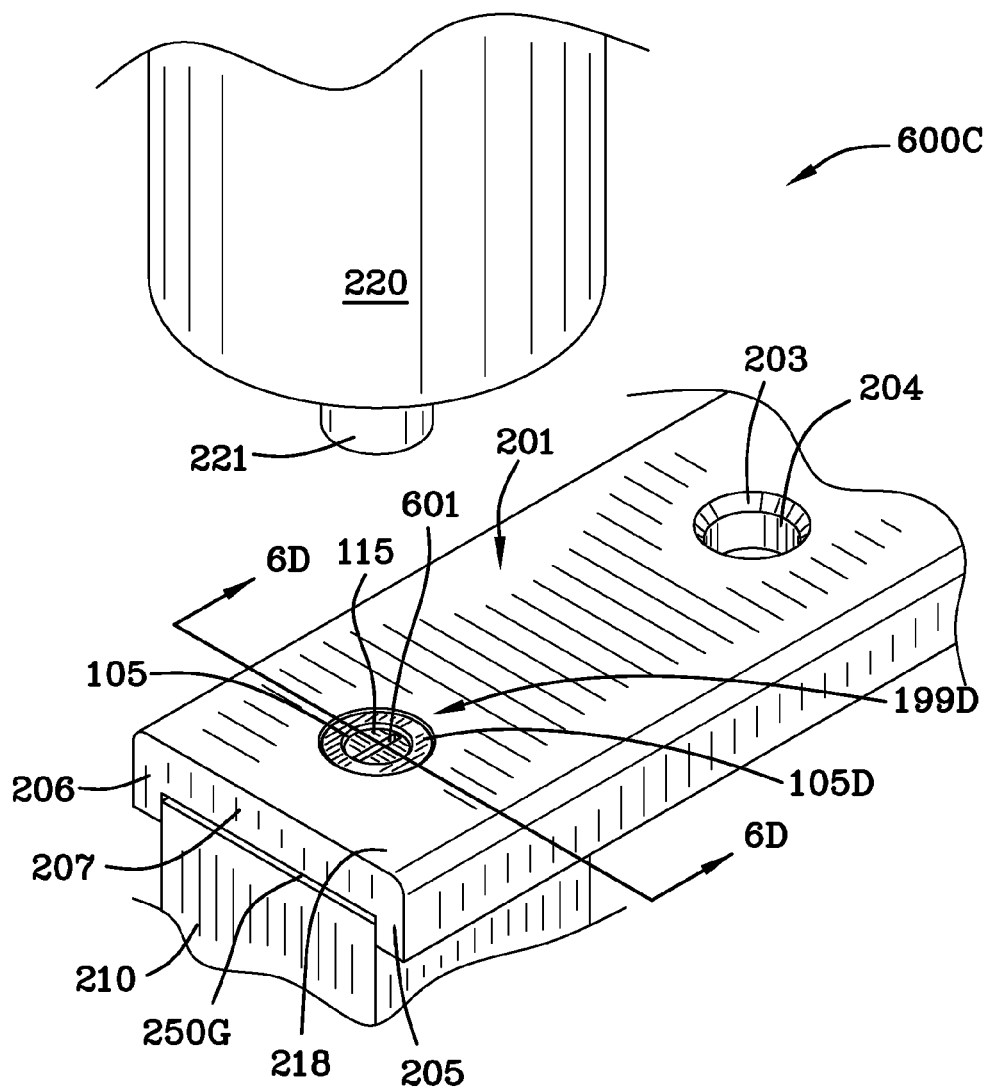
FIG. 6C is a perspective view of the rivet bolt deformed in the attachment with the interior square surfaces illustrated.
Figure 6D:
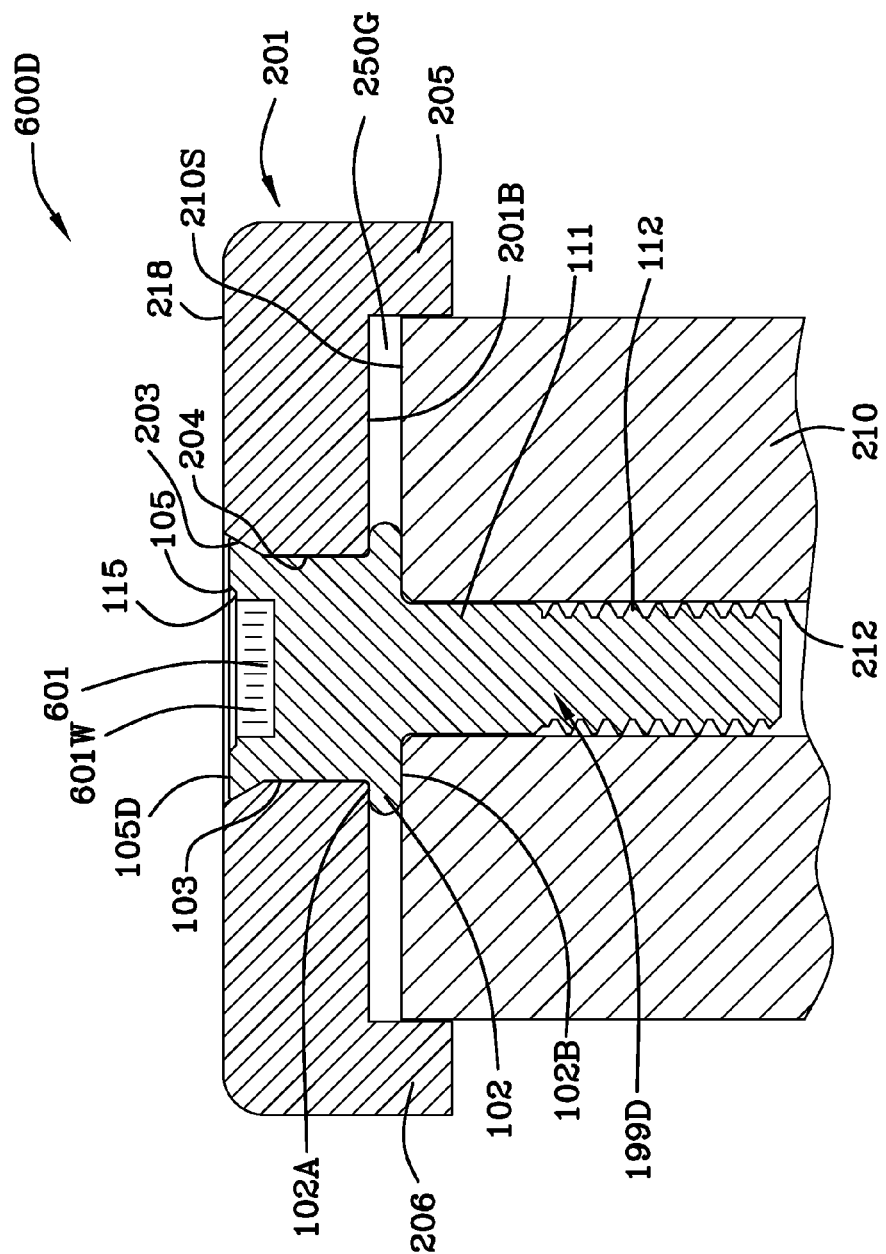
FIG. 6D is a cross-sectional view taken along the lines 6D-6D of FIG. 6C illustrating the deformed inverted frusto-conical surface which extends into the inverted frusto-conical surface the metal attachment.

FIG. 6C is a perspective view 600C of the rivet bolt 199D deformed in the attachment 201 with an interior square slot 601 illustrated. FIG. 6D is a cross-sectional view 600D taken along the lines 6D-6D of FIG. 6C illustrating the deformed inverted frusto-conical surface 105D which extends into the inverted frusto-conical surface 203 of the attachment 201.

FIG. 6D clearly illustrates the rivet bolt 199D secured to the attachment 201. The inverted frusto-conical surface 105D is deformed substantially into the inverted frusto-conical surface 203 of the attachment, however, the deformation of the rivet bolt 199D does not prevent the rivet bolt 199D from rotating with respect to the attachment 201. Upper cylindrical portion 103 of the rivet bolt 199D, after deformation, fits within the bore 204 of attachment 201 and fits within the inverted frusto-conical surface 203 of the attachment 201 such that rivet bolt 199D is rotatable with respect to the bore 204. Rivet bolt 199D must be rotatable as threads 112 engage a nut to fasten to a structure that is not shown.

Figure 7:
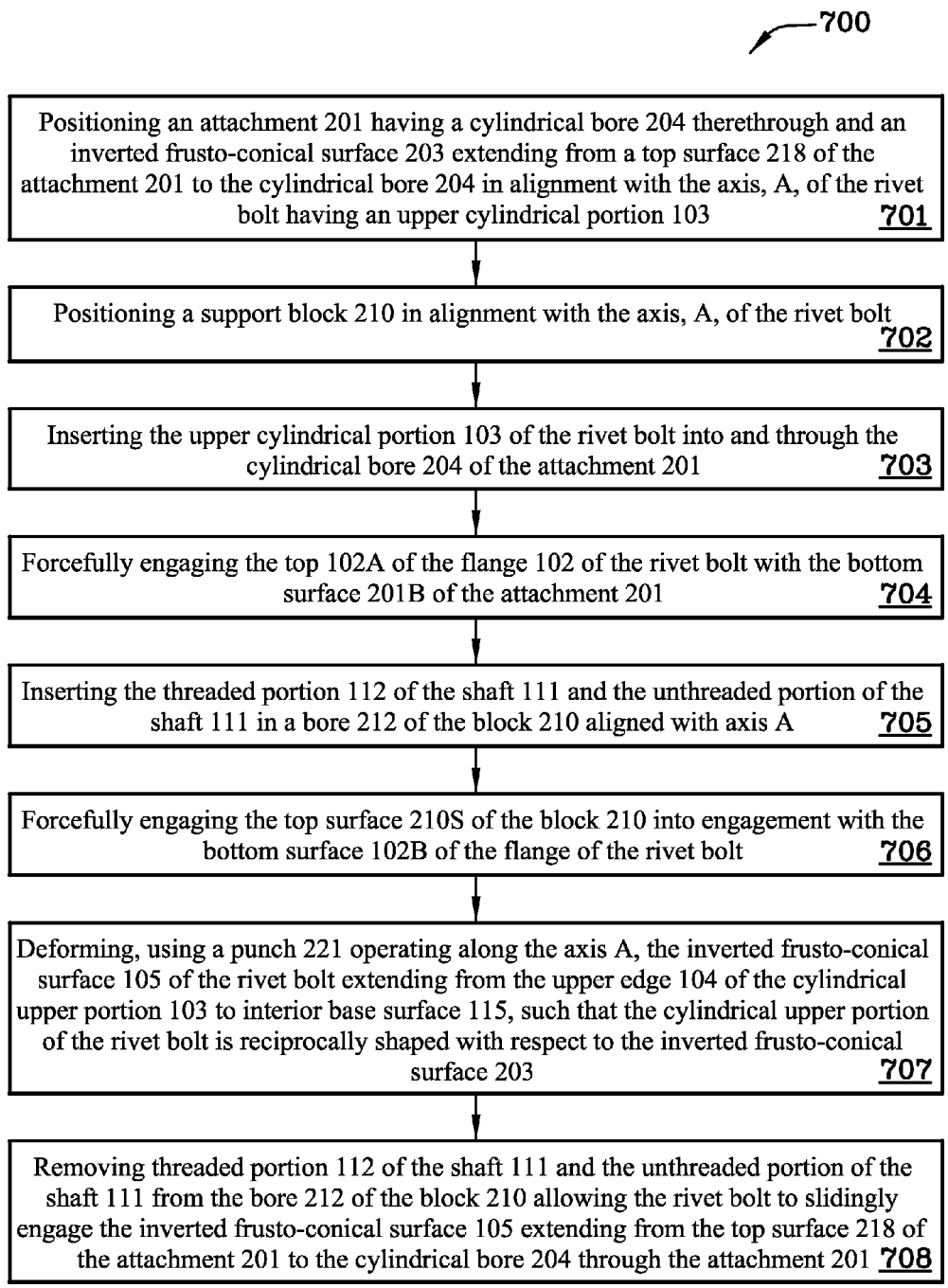
FIG. 7 is a schematic view of the process steps for securing the rivet bolt to the attachment.

FIG. 7 is a schematic view 700 of process steps for securing the rivet bolt 199, 199A, 199B, 199C, 199D to the attachment 201.

The process steps include:
positioning 701 an attachment 201 having a cylindrical bore 204 therethrough and an inverted frusto-conical surface 203 extending from a top surface 218 of the attachment 201 to the cylindrical bore 204 in alignment with the axis, A, of the rivet bolt having an upper cylindrical portion 103;

positioning 702 a support block 210 in alignment with the axis, A, of the rivet bolt;

inserting 703 the upper cylindrical portion 103 of the rivet bolt into and through the cylindrical bore 204 of the attachment 201;

forcefully engaging 703 the top 102A of the flange 102 of the rivet bolt with the bottom surface 201B of the attachment 201;

inserting 705 the threaded portion 112 of the shaft 111 and the unthreaded portion of the shaft 111 in a bore 212 of the block 210 aligned with axis A;

forcefully engaging 706 the top surface 210S of the block 210 into engagement with the bottom surface 102B of the flange of the rivet bolt;

deforming 707, using a punch 221 operating along the axis A, the inverted frusto-conical surface 105 of the rivet bolt extending from the upper edge 104 of the cylindrical upper portion 103 to interior base surface 115, such that the cylindrical upper portion of the rivet bolt is reciprocally shaped with respect to the inverted frusto-conical surface 203;

removing 708 the threaded portion 112 of the shaft 111 and the unthreaded portion of the shaft 111 from the bore 212 of the block 210 allowing the rivet bolt to rotatably and slidingly engage the inverted frusto-conical surface 105 extending from the top surface 218 of the attachment 201 to the cylindrical bore 204 through the attachment 201.

The process includes an interior base of the rivet bolt which includes a drive socket for the rivet bolt which includes one of a phillips drive socket; a hexagonally shaped drive socket, a torx drive socket, a square shaped drive socket, and a slot shaped drive socket.

REFERENCE NUMERALS

100—top view 100 of the rivet bolt 199
100A—side view 100A of the rivet bolt 199
100B—cross-sectional view 100B of the rivet bolt 199 taken along the lines 1B-1B of FIG. 1A
100C—enlargement of a portion of FIG. 1B illustrating zinc coating 116 covering the interior and exterior of the upper cylindrical portion 103
101—rounded edge of flange 102
102—flange
102A—top surface of flange 102 which engages with the bottom surface 201B of attachment 201
102B—bottom surface of flange 102 which engages top surface 210S of block 210
103—upper cylindrical portion
103R—fillet between flange 102 and upper cylindrical portion 103
104—upper edge of upper cylindrical portion 103
105—inverted frusto-conical surface extending from the upper edge 104 of the cylindrical upper portion 104 to interior base surface 115
105D—deformed inverted frusto-conical surface extending from the upper edge 104 of the cylindrical upper portion 104 to interior base surface 115
106—first groove or slot of phillips socket
106W—first pair of walls forming groove or slot of Phillips socket
107—second groove or slot of Phillips socket
107W—second pair of walls forming groove or slot of Phillips socket
108—third groove or slot of Phillips socket 108W—third pair of walls forming groove or slot of Phillips socket
109—relief
110—apex of relief
111—shaft of rivet bolt
112—threads of rivet bolt
113—fillet between shaft 111 and flange 102
115—interior base surface of upper cylindrical portion
116—zinc coating on the interior and exterior of the upper cylindrical portion 103
118—fourth groove or slot of Phillips socket
118W—fourth pair of walls forming groove or slot of Phillips socket
199—rivet bolt of first example/first embodiment which includes a phillips socket
199A—rivet bolt of second example/second embodiment which includes a hexagonal socket
199B—rivet bolt of third example/third embodiment which includes a torx socket
199C—rivet bolt of fourth example/fourth embodiment which includes a square socket
199D—rivet bolt of fifth example/fifth embodiment which includes a slot socket
200—an exploded perspective view 200 of the rivet bolt 199 in position for attachment to a attachment 201 wherein the attachment includes an inverted frusto-conical surface 203 extending from the top surface of the attachment 201 to a bore 204 in the attachment
200A—perspective view 200A of the piston 220 and punch 221 driven by the piston positioned above the rivet bolt 199
200B—perspective view 200B illustrating punch 221 has been extended in a downward direction as indicated by arrow 222
200C—perspective view similar to FIG. 2A illustrating the upper edge of upper cylindrical portion and the deformed inverted frusto-conical surface
200D—cross-sectional view taken along the lines 2D-2D of FIG. 2A illustrating the rivet bolt protruding above the surface of the attachment
200E—illustrates the rivet bolt deformed and in engagement with surface of the attachment.
200E—a cross-sectional view similar to FIG. 2E without the block
200G—an exploded perspective view of the rivet bolt in position for attachment to an attachment wherein the attachment includes a bore completely therethrough and where the attachment is made of wood
200H—a cross-sectional view similar to FIG. 2D illustrating the wood attachment, the bore completely through the wood attachment, and the upper cylindrical portion of the rivet bolt in the bore and protruding slightly above the top surface of the attachment
200I—is a cross-sectional view similar to FIG. 2H illustrating the punch engaging and deforming the upper cylindrical portion of the rivet bolt into the surrounding wood
200J—is a cross-sectional view similar to FIGS. 2D and 2H illustrating the plastic attachment, the bore completely through the plastic attachment, and the upper cylindrical portion of the rivet bolt in the bore and protruding slightly above the top surface of the attachment
200K—is a cross-sectional view similar to FIG. 2J illustrating with the punch engaging and deforming the upper cylindrical portion of the rivet bolt into the surrounding plastic
201—metallic attachment for receiving the rivet bolt 199
201B—bottom surface of the attachment 201
201P—attachment made of plastic
201W—attachment made of wood
203—inverted frusto-conical surface 203 extends from the top surface of the metallic attachment 201 to a bore 204 in the attachment 201
204—bore 204 in the metallic attachment 201
204P—through cylindrical bore in attachment 201P made of plastic
204W—through cylindrical bore in attachment 201W made of wood
205, 206—legs of metallic attachment 201
205W, 206W—legs of wooden attachment 201W
207—end of metallic attachment 201
207W—end of wooden attachment 201W
210—fixture block
210S—surface of block 210
212—bore in fixture block 210
218—surface of attachment
218P—top surface of plastic attachment 201P
218W—top surface of wooden attachment 201W
220—piston/air cylinder operating the punch
221—punch, typically made from A2 tool steel or other hardened tool steel
231P-bottom side of plastic attachment 231P
231W—bottom side of wooden attachment 231W
222—arrow indicating direction of punch 221
250G—gap between the bottom surface 201B of the attachment and the upper surface 210S of the block
261P—deformation of the plastic attachment 201P caused by the deformation 105d of the metal into the plastic, the deformation of the wood is also indicated by the dots in the deformed portion of the woof
261W—deformation of the wood attachment 201W caused by the deformation 105D of the metal into the wood, the deformation of the wood is also indicated by the dots in the deformed portion of the woof
300—top view of the rivet bolt 199A
300A—side view 300A of the rivet bolt 199A
300B—cross-sectional view 300B of the rivet bolt 199A taken along the lines 3B-3B of FIG. 3A
300C—perspective view of the rivet bolt 199A deformed in the attachment 201 with the interior hexagonal surfaces 301, 302, 305 and 306 illustrated
300D—cross-sectional view 300D taken along the lines 3D-3D of FIG. 3C 301, 302, 303, 304, 305, and 306—hexagonal interior surfaces
325—inverted frusto-conical surface which extends from the upper edge 104 of the cylindrical upper portion 103 to hexagonal interior surfaces 301, 302, 303, 304, 305 and 306
325D—deformed inverted frusto-conical surface of example depicted in FIG. 3
400—top view of a third embodiment or example of the rivet bolt 199B
400A—side view of the rivet bolt 199B
400B—cross-sectional view of the rivet bolt 199B taken along the lines 4B-4B of FIG. 4A
400C—perspective view of the rivet bolt 199B deformed in the attachment 201 with the interior torx surfaces 401, 402, 403 and 406 illustrated.
400D—a cross-sectional view taken along the lines 4D-4D of FIG. 4C illustrating the deformed inverted frusto-conical surface 105D which extends into the inverted frusto-conical surface 203 of the attachment 201
401, 402, 403, 404, 405 and 406—torx surfaces which mate with a torque drive not shown
500—a top view of a third embodiment or example of the rivet bolt 199C 500A—side view 500A of the rivet bolt 199C of FIG. 5
500B—cross-sectional view of the rivet bolt 199C taken along the lines 5B-5B of FIG. 5A
500C—a perspective view of the rivet bolt 199C deformed in the attachment 201 with the interior square surfaces 501, 502, 503 and 504 illustrated. FIG. 5D is a cross-sectional view 500D taken along the lines 5D-5D of FIG. 5C illustrating the deformed inverted frusto-conical surface 105D which extends into the inverted frusto-conical surface 203 of the attachment 201
500D—a cross-sectional view taken along the lines 5D-5D of FIG. 5C illustrating the deformed inverted frusto-conical surface which extends into the inverted frusto-conical surface the attachment
600—a top view of a third embodiment or example of the rivet bolt 199D
600A—side view 600A of the rivet bolt 199D of FIG. 6
600B—cross-sectional view of the rivet bolt 199D taken along the lines 6B-6B of FIG. 6A
600C—a perspective view of the rivet bolt 199D deformed in the attachment 201 with the interior slot illustrated. FIG. 6D is a cross-sectional view 600D taken along the lines 6D-6D of FIG. 6C illustrating the deformed inverted frusto-conical surface 105D which extends into the inverted frusto-conical surface 203 of the attachment 201
600D—a cross-sectional view taken along the lines 6D-6D of FIG. 6C illustrating the deformed inverted frusto-conical surface which extends into the inverted frusto-conical surface of the attachment
601—slot
601W—walls of slot 601
700—process steps for securing the rivet bolt 199, 199A, 199B, 199C, 199D to the attachment 201
701—positioning an attachment 201 having a cylindrical bore 204 therethrough and an inverted frusto-conical surface 203 extending from a top surface 218 of the attachment 201 to the cylindrical bore 204 in alignment with the axis, A, of the rivet bolt having an upper cylindrical portion 103
702—positioning a support block 210 in alignment with the axis, A, of the rivet bolt
703—inserting the upper cylindrical portion 103 of the rivet bolt into and through the cylindrical bore 204 of the attachment 201
704—forcefully engaging the top 102A of the flange 102 of the rivet bolt with the bottom surface 201B of the attachment 201
705—inserting the threaded portion 112 of the shaft 111 and the unthreaded portion of the shaft 111 in a bore 212 of the block 210 aligned with axis A
706—forcefully engaging the top surface 210S of the block 210 into engagement with the bottom surface 102B of the flange of the rivet bolt
707—deforming, using a punch 221 operating along the axis A, the inverted frusto-conical surface 105 of the rivet bolt extending from the upper edge 104 of the cylindrical upper portion 103 to interior base surface 115, such that the cylindrical upper portion of the rivet bolt is reciprocally shaped with respect to the inverted frusto-conical surface 203
708—removing threaded portion 112 of the shaft 111 and the unthreaded portion of the shaft 111 from the bore 212 of the block 210 allowing the rivet bolt to slidingly engage the inverted frusto-conical surface 105 extending from the top surface 218 of the attachment 201 to the cylindrical bore 204 through the attachment 201

The invention has been described by way of example only. Those skilled in the art may make changes and modifications to the invention as described herein without departing from the spirit and scope of the appended claims.

The invention claimed is:

1. A rivet bolt in combination with an attachment, comprising:
    said rivet bolt comprising:
    a flange;
    said flange includes a top surface and a bottom surface:
    an upper cylindrical portion;
    a first fillet between said upper cylindrical portion and said flange;
    a shaft;
    a second fillet between said shaft and said flange;
    said shaft includes a threaded portion;
    said upper cylindrical portion includes an upper edge;
    said upper cylindrical portion includes an interior base surface;
    an inverted frusto-conical surface extending from said upper edge of said cylindrical upper portion to interior base surface;
    said attachment comprising:
    a top surface and a bottom surface;
    a cylindrical bore therethrough;
    an inverted frusto-conical surface extending from said top surface of said attachment to said cylindrical bore through said attachment;
    said top surface of said flange of said rivet bolt engages said bottom surface of said attachment; and,
    said upper cylindrical portion of said rivet bolt resides partially within said cylindrical bore of said attachment.

2. A rivet bolt in combination with an attachment as claimed in claim 1, wherein said attachment includes first and second legs, said first and second legs extend perpendicularly from said top surface of said attachment.

3. A rivet bolt in combination with an attachment as claimed in claim 1, wherein said rivet bolt includes a phillips drive head socket.

4. A rivet bolt in combination with an attachment as claimed in claim 1, wherein said rivet bolt includes a hexagonally shaped drive head socket.

5. A rivet bolt in combination with an attachment as claimed in claim 1, wherein said rivet bolt includes a torx shaped drive head.

6. A rivet bolt in combination with an attachment as claimed in claim 1, wherein said rivet bolt includes a square shaped drive head socket.

7. A rivet bolt in combination with an attachment as claimed in claim 1, wherein said rivet bolt includes a slot shaped drive head socket.

8. A rivet bolt in combination with an attachment, comprising:
    said rivet bolt comprising: a flange; said flange includes a top surface and a bottom surface; an upper cylindrical portion; a shaft; said shaft includes a threaded portion; said upper cylindrical portion includes an upper edge; said upper cylindrical portion includes an interior base surface;
    said attachment comprising: a top surface and a bottom surface; a cylindrical bore therethrough; an inverted frusto-conical surface extending from said top surface of said attachment to said cylindrical bore through said attachment;
    said top surface of said flange of said rivet bolt engages said bottom surface of said attachment; said upper cylindrical portion of said rivet bolt being deformed and reciprocally shaped with respect to said inverted frusto-conical surface of said attachment; said deformed and reciprocally shaped portion of said rivet bolt slidingly engaging said inverted frusto-conical surface extending from said top surface of said attachment to said cylindrical bore through said attachment; said deformed and reciprocally shaped portion of said rivet bolt countersunk with respect to said top surface of said attachment; and, said upper cylindrical portion of said rivet bolt resides partially within said cylindrical bore of said attachment.

9. A rivet bolt in combination with an attachment as claimed in claim 8, wherein said attachment includes first and second legs, said first and second legs extend perpendicularly from said top surface of said attachment.

10. A rivet bolt in combination with an attachment as claimed in claim 8, wherein said rivet bolt includes a phillips drive head socket.

11. A rivet bolt in combination with an attachment as claimed in claim 8, wherein said rivet bolt includes a hexagonally shaped drive head socket.

12. A rivet bolt in combination with an attachment as claimed in claim 8, wherein said rivet bolt includes a torx drive head drive head socket.

13. A rivet bolt in combination with an attachment as claimed in claim 8, wherein said rivet bolt includes a square shaped drive head.

14. A rivet bolt in combination with an attachment as claimed in claim 8, wherein said rivet bolt includes a slot shaped drive head socket.

15. A process for making a rivet bolt in combination with an attachment, comprising the steps of:
    positioning an attachment, said attachment having a cylindrical bore therethrough and said attachment having an inverted frusto-conical surface extending from a top surface of said attachment to said cylindrical bore of said attachment, in alignment with axis, A, of said rivet bolt, said rivet bolt having an upper cylindrical portion;
    positioning a support block in alignment with axis, A, of said rivet bolt;
    inserting said upper cylindrical portion of said rivet bolt into and through said cylindrical bore of said attachment;
    forcefully engaging the top of the flange of said rivet bolt with the bottom surface of said attachment;
    inserting the threaded portion of the shaft of said rivet bolt and the unthreaded portion of the shaft of said rivet bolt in a bore of said support block aligned with said axis A;
    forcefully engaging the top surface of said block into engagement with the bottom surface of the flange of said rivet bolt;
    deforming, using a punch operating along the axis A, the inverted frusto-conical surface of said rivet bolt extending from the upper edge of said cylindrical upper portion to the interior base surface, such that said cylindrical upper portion of said rivet bolt is reciprocally shaped with respect to said inverted frusto-conical surface of said attachment; and,
    removing said threaded portion of said shaft of said rivet bolt and said unthreaded portion of said shaft of said rivet bolt from said bore of said support block allowing said rivet bolt to slidingly engage said inverted frusto-conical surface extending from said top surface of said attachment to said cylindrical bore through said attachment.

16. A process for making a rivet bolt in combination with an attachment as claimed in claim 15, wherein said interior base of said rivet bolt includes phillips drive socket.

17. A process for making a rivet bolt in combination with an attachment as claimed in claim 15, wherein said interior base of said rivet bolt includes a hexagonally shaped drive socket.

18. A process for making a rivet bolt in combination with an attachment as claimed in claim 15, wherein said interior base of said rivet bolt includes a torx drive socket.

19. A process for making a rivet bolt in combination with an attachment as claimed in claim 15, wherein said interior base of said rivet bolt includes a square shaped drive socket.

20. A process for making a rivet bolt in combination with an attachment as claimed in claim 15, wherein said interior base of said rivet bolt includes a slot shaped drive socket.

21. A rivet bolt in combination with an attachment, comprising:
    said rivet bolt comprising: a flange; said flange includes a top surface and a bottom surface; an upper cylindrical portion; a first fillet between said upper cylindrical portion and said flange; a shaft; a second fillet between said shaft and said flange; said shaft includes a threaded portion; said upper cylindrical portion includes an upper edge; said upper cylindrical portion includes an interior base surface;
    said attachment comprising: a top surface and a bottom surface; a cylindrical bore therethrough;
    said top surface of said flange of said rivet bolt engages said bottom surface of said attachment; said upper cylindrical portion of said rivet bolt being deformed and reciprocally shaped and slidingly engaging a deformed cylindrical bore through said attachment; said deformed and reciprocally shaped portion of said rivet bolt countersunk with respect to said top surface of said attachment; and, said upper cylindrical portion of said rivet bolt resides partially within said cylindrical bore of said attachment.

22. A rivet bolt in combination with an attachment as claimed in claim 21 wherein said attachment is a deformable material.

23. A rivet bolt in combination with an attachment as claimed in claim 21 wherein said attachment is wood.

24. A rivet bolt in combination with an attachment as claimed in claim 21 wherein said attachment is plastic.

* * * * *